(12) United States Patent
Brakob et al.

(10) Patent No.: US 12,014,544 B2
(45) Date of Patent: Jun. 18, 2024

(54) IDENTIFYING SCANNING MOTIONS DURING CHECKOUT USING OVERHEAD CAMERAS

(71) Applicant: Target Brands, Inc., Minneapolis, MN (US)

(72) Inventors: Christopher Brakob, Minneapolis, MN (US); Ethan Sommer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 156 days.

(21) Appl. No.: 17/878,644

(22) Filed: Aug. 1, 2022

(65) Prior Publication Data

US 2023/0056327 A1 Feb. 23, 2023

Related U.S. Application Data

(60) Provisional application No. 63/281,436, filed on Nov. 19, 2021, provisional application No. 63/235,530, filed on Aug. 20, 2021.

(51) Int. Cl.
*G06V 20/40* (2022.01)
*G06N 20/00* (2019.01)
*G06Q 20/20* (2012.01)
*G06V 20/52* (2022.01)

(52) U.S. Cl.
CPC ............. *G06V 20/44* (2022.01); *G06N 20/00* (2019.01); *G06Q 20/208* (2013.01); *G06V 20/52* (2022.01)

(58) Field of Classification Search
CPC ........ G06V 20/44; G06V 20/52; G06V 40/28; G06N 20/00; G06Q 20/208; G07G 1/0054; G07G 1/0081
See application file for complete search history.

(56) References Cited

U.S. PATENT DOCUMENTS

| | | | |
|---|---|---|---|
| 5,883,968 | A | 3/1999 | Welch et al. |
| 7,422,147 | B2 | 9/2008 | Rosenbaum |
| 7,909,248 | B1 | 3/2011 | Goncalves |
| 8,068,674 | B2 | 11/2011 | Goncalves |
| 8,117,071 | B1 | 2/2012 | Fitch et al. |

(Continued)

FOREIGN PATENT DOCUMENTS

WO WO-2021195523 A1 * 9/2021 ........... G06Q 20/208

*Primary Examiner* — Padma Haliyur
(74) *Attorney, Agent, or Firm* — Barnes & Thornburg LLP

(57) ABSTRACT

Described herein are systems and methods for determining whether a scanning motion occurred during a checkout process. The system includes a checkout lane having a scanning area that receives products to be purchased by a user, scanning devices, a point of sale (POS) terminal that identifies a product based on a scan, using the scanning devices, of a product identifier for the product as the product is moved through the scanning area, and an overhead camera that captures image data of the user's body movements and transmits, to a computing system, the image data. The computing system can, during runtime, identify whether a scanning motion occurred during the user's body movements based on application of one or more motion identification models to the image data and determine, based on identification of the scanning motion, that the user performed an affirmative scan during the checkout process.

32 Claims, 12 Drawing Sheets

(56) References Cited

U.S. PATENT DOCUMENTS

| | | | |
|---|---|---|---|
| 8,336,761 B1 | 12/2012 | McCloskey | |
| 8,448,859 B2 | 5/2013 | Goncalves et al. | |
| 10,474,858 B2 | 11/2019 | Davis et al. | |
| 10,650,040 B2 | 5/2020 | Dube et al. | |
| 10,733,620 B1* | 8/2020 | Brakob | G01S 13/86 |
| 11,526,871 B2* | 12/2022 | Ju | G07G 1/0072 |
| 2009/0026270 A1 | 1/2009 | Connell et al. | |
| 2018/0232569 A1* | 8/2018 | Belkin | G06V 40/70 |
| 2020/0042491 A1* | 2/2020 | Licht | G07G 1/0045 |
| 2020/0279310 A1* | 9/2020 | Kundu | G07G 1/0036 |
| 2021/0117948 A1* | 4/2021 | Voss | G06F 18/40 |
| 2021/0216785 A1* | 7/2021 | Debucean | G06F 18/2415 |
| 2023/0120798 A1* | 4/2023 | Palande | G06V 10/25 |
| | | | 705/23 |

\* cited by examiner

IDENTIFYING SCANNING MOTIONS DURING CHECKOUT USING OVERHEAD CAMERAS

CROSS-REFERENCE TO RELATED APPLICATIONS

This application claims the benefit of U.S. Application Ser. No. 63/281,436, filed on Nov. 19, 2021 and U.S. Application Ser. No. 63/235,530, filed on Aug. 20, 2021. The disclosures of the prior applications are considered part of the disclosure of this application, and are incorporated in their entireties into this application.

TECHNICAL FIELD

This document generally describes devices, systems, and methods related to determining whether a scanning motion has occurred during a checkout process.

BACKGROUND

In retail environments, such as grocery stores, customers can purchase different types of products that can be priced differently. Prices can vary based on category or grouping of products. For example, fresh produce can be priced differently than frozen foods. As another example, grocery items can be priced differently than electronics or clothing.

When a customer checks out in a retail environment, such as at a self-checkout lane with a point of sale (POS) terminal, a product label, such as a barcode, can be scanned to identify a product that the customer is purchasing. The product identifier can be used to determine the product price, which can be retrieved from a database storing current prices associated with product identifiers, as well as any discounts or promotions that may apply as part of the transaction. Sometimes, the product label can be a sticker, barcode, or other type of label that can be removed from the product. In some instances, customers may intentionally or unintentionally fail to scan the label. As a result, the customers may leave the store with the product but without paying for it. In some instances, a customer may make fake scanning motions at the self-checkout lane to persuade others who may be watching that the customer is scanning and paying for the product. Leaving the store with the product but without paying for it may constitute a form of theft since the customer is not paying for the product and instead is faking scanning motions or not scanning the product in the first place.

SUMMARY

The document generally relates to detecting when a customer performs a scanning motion but fails to scan a product label at a product scanner, such as a product scanner that is part of a point of sale terminal. For example, the disclosed technology can use sensors, such as cameras that are located around a checkout area having POS terminals, to capture user movement data (e.g., image data) during a checkout process and can process the movement data using one or more trained machine learning models to automatically determine whether the customer has performed an scanning motion during a checkout process. Such a determination about whether a user has performed scanning motion can be compared to data from a POS terminal to identify whether the customer successfully scanned the product at the POS terminal as part motion, or whether the user may have either inadvertently or intentionally missed the product scan. When a missed scan is detected based on a scanning motion having been identified without a corresponding product scan having been registered with the POS terminal, various actions can be performed in response, such as presenting a message about the missed scan on a display for the POS terminal (e.g., message informing the user that the scan was missed and asking them to retry the scan), requesting that the user provide identifying information (e.g., scan loyalty card, enter credit card, scan identification card), alerting a nearby worker to assist the user at the POS terminal, alerting in-store security about the potential issue, and/or other actions. Some actions may be oriented at remedying the missed scan, whereas other actions may be directed toward mitigating the risk of potential theft of an item from the store.

Any of a variety of systems and devices can be used as part of the disclosed technology. For example, an overhead camera can continuously capture video data of a checkout lane. The video data can be analyzed in segments, such as 7 second slices, using one or more machine learning models. The video segments can be inputted into the models and the models can be trained to identify scanning motions in the video segments. If a confidence value assigned to an identified scanning motion exceeds some predetermined threshold level, it can be determined that the customer scanned a product label at the checkout lane. This determination can also be validated by polling the POS terminal for registration of a scanning event.

If the POS terminal registered a scanning event within a threshold period of time from the identified scanning motion, then it can be confirmed that the customer scanned the product label and is not engaging in suspicious behavior. It can also be determined whether the POS terminal registered a scanning event based on detecting an optical signal in the video feed at or near the time of the scanning motion. The optical signal can be a light emitted by the POS terminal when a product label is successfully scanned. It can also be determined whether the POS terminal registered a scanning event based on detecting an audio signal in the video feed at or near the time of the scanning motion. The audio signal can be a chime or other sound that is emitted by the POS terminal when the product label is successfully scanned.

If, on the other hand, the confidence level that the customer performed a scanning motion is below the predetermined threshold level and/or the POS terminal did not register a scanning event, then output can be provided to the customer and/or in-store employees, such as safety and security personnel. The output can include a notification that there was a missed scan or that the customer should try scanning the product label again. The output may include temporarily stopping the customer's transaction. The output may also include notifying the in-store employee to review the video data and/or intervene before the customer completes the transaction and exits the store.

Performing false scanning motions can be difficult to detect in the moment because, conventionally, in-store employees would review video feeds and subjectively have to determine whether the customer is in fact scanning a product. The in-store employee may make false assumptions about the actions and intentions of the customer without having a means to validate their assumptions. Sometimes, the in-store employee may manually validate their assumption using POS transaction data, but this validation may be time-consuming and may not occur until the customer has already left the store. As a result, the in-store employee would not be able to apprehend the customer if they in fact stole a product or products or otherwise perform some form of theft prevention. The disclosed technology can, however, provide automated and objective techniques to positively identify scanning motions and validate those identifications with additional data, such as POS data or signals that are detected in the video data, in real-time and/or near real-time. As a result, the disclosed technology provides for identifying theft events or other suspicious activity that may occur during the checkout process.

An initial training phase can be used to generate models for identifying scanning motions in video data. Models can be trained using video data that is annotated with affirmative scanning motions and missed scanning motions, POS data logs indicating affirmative and missed scanning events, and additional data, such as payment information and input provided at touch screens during checkout. During runtime, video data of the customer during the checkout process can be inputted into one or more models. Scanning motions made by the customer can be identified from segments of the video data, and a determination can be made as to whether the customer actually scanned a product. Such a determination may simply determine whether, or a degree to which, the customer performed an affirmative scanning motion (e.g., whether theft has taken place and/or whether the customer has made a mistake while trying to scan the product). Other determinations are also possible.

Overhead cameras can be preconfigured in the checkout area of a store. The checkout area can include multiple overhead cameras. One overhead camera can be trained on one POS terminal and associated checkout lane. One overhead camera can also be trained on multiple POS terminals and associated checkout lanes, such as two POS terminals and associated checkout lanes. The overhead cameras can be part of an existing security system. The overhead cameras can also be low resolution cameras. Configurations of the overhead cameras can be the same across different stores. As a result, each camera can capture images of a flatbed scanning area of the POS terminals through a consistent field of view (FOV). The consistent FOV can make it easier and more accurate for a computing system to train machine learning models to identify scanning motions using video data. Different configurations of the overhead cameras across the different stores is also possible.

Each checkout lane in the checkout area can also include a POS terminal, scanning devices, and one or more additional cameras. A customer can scan a product label, such as a barcode, using the scanning devices. The POS terminal can identify a product associated with the scanned barcode and can transmit that identification to the computing system as described herein. The POS terminal can also transmit other information indicating registration of a scanning event to the computing system. The one or more additional cameras can also be used to capture image data of the product and/or the scanning motion of the customer, which can be used by the computing system to validate or otherwise check whether the customer performed an affirmative scanning motion.

Moreover, the overhead cameras and/or the additional cameras at the checkout lane can be used to monitor the customer as they proceed through the checkout process. Image data captured by such cameras can be used to objectively identify the customer once the computing system determines that the customer did not perform an affirmative scanning motion. In-store employees, such as safety and security personnel, can therefore use this image data to positively and objectively identify and stop the customer who is engaging in theft or other suspicious activity.

One or more embodiments described herein include a system for determining whether a scanning motion occurred during a checkout process, the system including a checkout lane and a computing system. The checkout lane can include a scanning area that can receive one or more products to be purchased by a user, the scanning area including one or more scanning devices, a point of sale (POS) terminal configured to identify a product based on a scan, using the one or more scanning devices, of a product identifier for the product as the product is moved through the scanning area, and an overhead camera having a field of view that includes the scanning area. The overhead camera can capture image data of the user's body movements as the user moves the product through the scanning area, and transmit, to a computing system, the image data of the user's body movements. The computing system can determine, during runtime, whether the user's body movements are scanning motions. The computing system can retrieve, from a data store, one or more motion identification models that were previously trained using image training data and one or more machine learning motion identification models, identify whether a scanning motion occurred during the user's body movements based on application of the one or more motion identification models to the image data, and determine, based on identification of the scanning motion, that the user performed an affirmative scan during the checkout process.

The system can optionally include one or more of the following features. For example, the overhead camera can have a field of view that includes scanning areas of multiple checkout lanes. The image training data can include video feeds of scanning motions of users taken from a plurality of overhead cameras at several checkout lanes. The overhead cameras can have at least one of a same (i) vantage point of the plurality of checkout lanes, (ii) field of view, (iii) lighting, and (iv) image resolution.

As another example, the computing system can generate the one or more motion identification models based on retrieving, from the data store, (i) the image training data that have been previously annotated with a plurality of affirmative scanning motions and (ii) other training data, training, based on correlating (i) with (ii), the one or more motion identification models to identify the plurality of affirmative scanning motions in the image training data, and outputting the one or more motion identification models. In some implementations, the other training data can include at least one of (i) POS transaction data that correlates with the plurality of affirmative scanning motions depicted in the image training data, (iii) payment information that correlates with the POS transaction data, and (iv) user input provided at the POS terminal that correlates with at least one of the plurality of affirmative scanning motions and the POS transaction data. In some implementations, the computing system can also generate the one or more motion identification models based at least in part on lighting conditions, equipment in the checkout lane, a store configuration, and seasonal information.

As another example, the computing system can poll the POS terminal for an indication of a registered scanning event, determine whether the registered scanning event is within a threshold period of time from the scanning motion based on comparing a timestamp of the registered scanning event with a timestamp of the scanning motion, and determine, based on the registered scanning event being within the threshold period of time from the scanning motion, that the user performed an affirmative scan during the checkout process. In some implementations, the computing system can also determine, based on the registered scanning event exceeding the threshold period of time from the scanning motion, that the user did not perform an affirmative scan during the checkout process, and generate output indicating that the user did not perform the affirmative scan. As another example, the output can be a notification prompting the user to rescan the produce identifier for the product and the computing system can transmit the notification to the POS terminal to be presented on a display screen at the checkout lane. As another example, the output can be a notification for an in-store employee that indicates that the user did not perform the affirmative scan and the computing system can transmit the notification to a user device of the in-store employee to be presented on a display screen of the user device.

In some implementations, the computing system can identify whether an optical signal is detected in the image data, and determine, based on identification that the optical signal is not detected, whether the scanning motion occurred based on application of the one or more motion identification models to the image data. As another example, the computing system can determine, based on identification that the optical signal is detected, that the user performed an affirmative scan during the checkout process. In some implementations, the optical signal can be at least one of a flash of light, an infrared signal, a red light, a green light, and a change in display on a display screen of the POS terminal. The optical signal can be emitted by at least one of the POS terminal and the one or more scanning devices.

As yet another example, the computing system can identify whether an audio signal is detected in the image data, and determine, based on identification that the audio signal is not detected, whether the scanning motion occurred based on application of the one or more motion identification models to the image data. In some implementations, the computing system can determine, based on identification that the audio signal is detected, that the user performed an affirmative scan during the checkout process.

In some implementations, the computing system can detect presence of the user at the checkout lane based at least in part and on at least one of (i) identifying the user in the image data, (ii) receiving, from the POS terminal, input provided by the user at the POS terminal, and (iii) identifying, based on one or more weight sensors at the checkout lane, weight of one or more products that are placed by the user at the checkout lane, retrieve, from the data store and based on detecting the presence of the user, the one or more motion identification models, and identify whether the scanning motion occurred based on application of the one or more motion identification models to the image data.

As another example, determining, based on identification of the scanning motion, that the user performed an affirmative scan during the checkout process can include determining whether a confidence level of the scanning motion exceeds a predetermined threshold level, identify, based on determining that the confidence level exceeds the predetermined threshold level, that the user performed an affirmative scan, and identify, based on determining that the confidence level is less than the predetermined threshold level, that the user did not perform an affirmative scan. As another example, the computing system can generate output indicating that the user did not perform the affirmative scan.

One or more embodiments described herein can also include a computing system for determining whether a scanning motion occurred during a checkout process. The computing system can, during runtime receive, from an overhead camera at a checkout lane, image data of a user's body movement as the user moves a product through a scanning area at the checkout lane, retrieve, from a data store, one or more motion identification models that were previously trained using image training data and one or more machine learning motion identification models, identify whether a scanning motion occurred during the user's body movements based on application of the one or more motion identification models to the image data, and determine, based on identification of the scanning motion, that the user performed an affirmative scan during the checkout process.

The computing system can optionally include one or more features described above. As another example, the computing system can generate the one or more motion identification models based on retrieving, from the data store, (i) the image training data that have been previously annotated with a plurality of affirmative scanning motions and (ii) other training data, training, based on correlating (i) with (ii), the one or more motion identification models to identify the plurality of affirmative scanning motions in the image training data, and outputting the one or more motion identification models.

The devices, system, and techniques described herein may provide one or more of the following advantages. For example, the disclosed technology can be used to detect whether a customer engaged in theft or other suspicious activity in a retail environment, such as a store. Using the techniques described herein, the disclosed technology can determine whether the customer is actually performing a scanning motion during a checkout process. Such a determination can be made quickly using machine learning models that have been trained with robust training datasets, thereby improving accuracy in scanning motion identification determinations. If a determination is made that a scanning motion was not identified, then safety and security personnel can be notified of this incident. The safety and security personnel can respond accordingly, whether it be apprehending the customer before the customer leaves the store and/or monitoring the customer when they return to the store in the future. As a result of the disclosed technology, theft and other suspicious activity incidents can be identified and appropriate action can be taken to resolve or otherwise stop such incidents from occurring.

Moreover, the disclosed technology can be used to build accurate machine learning models from robust training datasets. Video data can be collected from a plurality of cameras in checkout areas of one or more stores. The video data can be used by a computing system to train one or more machine learning models to identify scanning motions. The computing system can also use POS data logs and/or other data to associate scanning motions in the video data with affirmative scans during a checkout process. Scanning motion identification determinations that are made using the machine learning models can also be used by the computing system to continuously improve such machine learning models. As a result, the machine learning models can more accurately identify scanning motions from a variety of video data.

Similarly, the disclosed technology can provide for improved data capture, which can be beneficial to train the machine learning models. Overhead cameras can be similarly configured and positioned in checkout areas across different stores. Thus, the cameras can capture consistent images and maintain uniform fields of view (FOV). The images captured by the overhead cameras may also have uniform lighting and angles that can make training machine learning models both easier and more accurate. The captured images can therefore be used to generate robust and uniform training datasets of scanning motions. These training datasets can then be used by the computing system to train the machine learning models to more accurately identify scanning motions from the image data.

As another example, the disclosed technology can be integrated with existing overhead cameras in stores. Overhead cameras that may be installed in a store for security purposes (e.g., as part of an in-store security system) can be configured to detect scanning motions at POS terminals and capture video data of scanning areas at the POS terminals where the scanning motions occur. This video data can then be used by the computing system to determine whether the customer has properly scanned products. As a result, new or additional cameras are not required to be installed in the checkout areas of the stores, which can make implementation of the disclosed technology easy and inexpensive. Furthermore, since the overhead cameras may be of low resolution, the machine learning models that are used for scanning motion identification can be trained using low resolution images from the overhead cameras. Therefore, the machine learning models can more accurately detect and identify scanning motions from low resolution images.

As yet another example, the disclosed technology provides for objective and non-obtrusive identification of theft or other suspicious activity. Instead of using time-consuming and computationally extensive video analytics to detect theft and profile customers engaging in theft, the disclosed technology provides for automated and accurate detection of scanning motions using machine learning models. The machine learning models are trained with robust datasets such that the models are highly accurate in detecting affirmative scanning motions and missed scanning motions, where the missed scanning motions are indicative of theft or other suspicious activity. When theft or other suspicious activity is detected, the computing system can provide output or some other response to the customer and/or safety and security personnel. As a result, the customer can be apprehended and/or monitored without subjectively profiling the customer.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to determining whether an affirmative scanning motion was made by a customer during a checkout process. The disclosed technology can be used to identify situations when a customer engages in theft or other suspicious activity, such as faking a scanning motion so that the customer does not have to pay for a product or not scanning the product at all. One or more machine learning models can be used to identify scanning motions during the checkout process from video data. For example, the models can be trained to identify scanning motions and assign confidence values to the motions. The confidence values can be analyzed to determine a likelihood that the scanning motion is in fact an affirmative scanning motion. The disclosed technology can also provide for comparing the identified scanning motions to POS transaction data or other data (e.g., optical signals and/or light signals in the video data) to verify that the customer in fact performed a scanning event. Using the techniques described herein, the disclosed technology can also provide for ways to prevent theft or other suspicious activity from occurring and/or to apprehend or otherwise monitor customers who engage in such activity.

Figure 1:
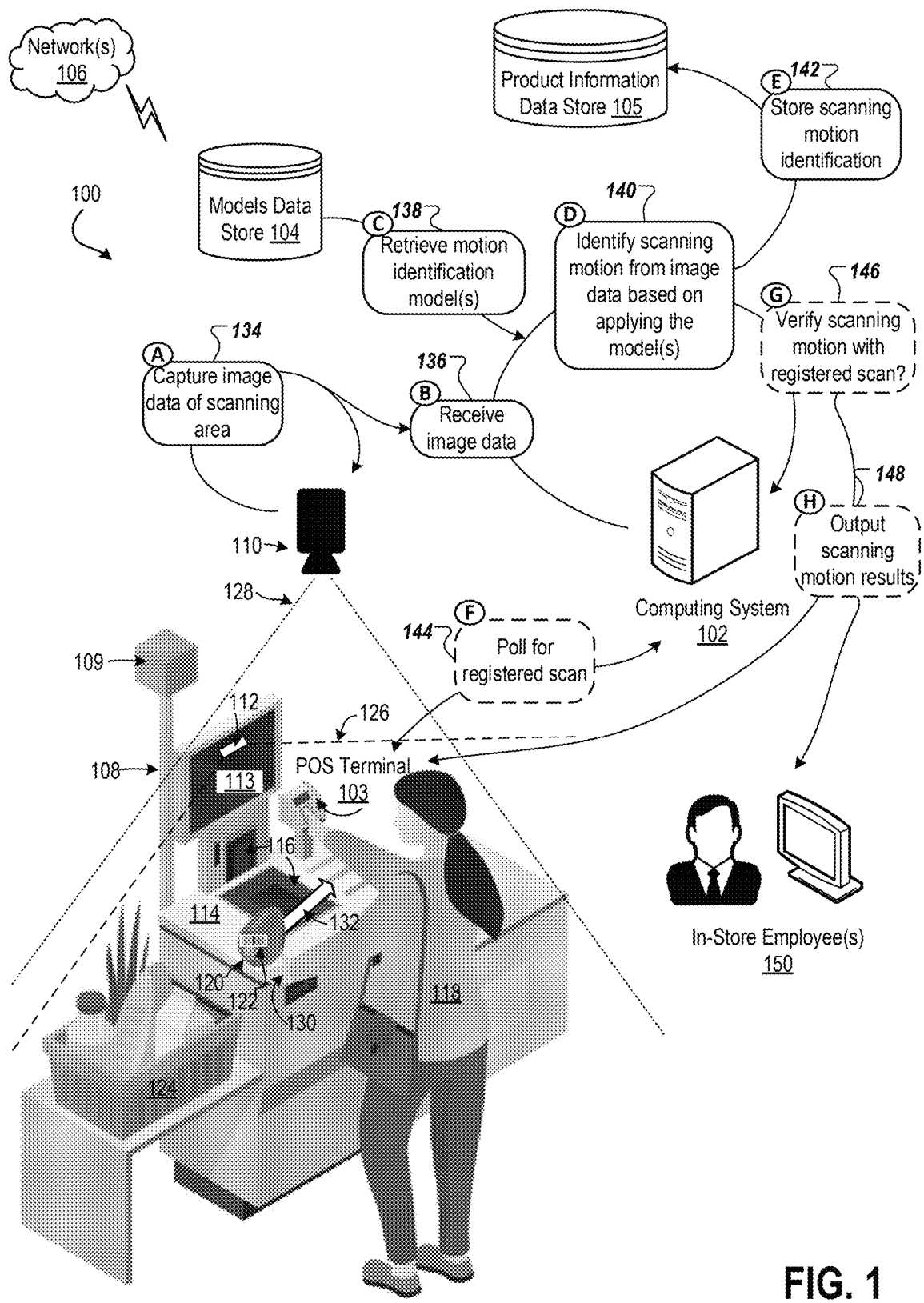
FIG. 1 is a conceptual diagram of a checkout process using the techniques described herein.

Referring to the figures, FIG. 1 is a conceptual diagram of a checkout process using the techniques described herein. A checkout lane 100 can include a flatbed 114, one or more scanning devices 116, a POS terminal 103, a light pole 108, and an overhead camera 110. A retail environment, such as a grocery store, can include multiple checkout lanes 100 that customers, such as customer 118, can use to go through a self-checkout process. The POS terminal 103, the scanning devices 116, and the overhead camera 110 can communicate (e.g., wired and/or wirelessly) via network(s) 106 with a computing system 102.

The computing system 102 can be configured to determine whether the customer 118 performs a scanning motion during checkout, as described further below. The computing system 102 can be remote from components of the checkout lane 100. The computing system 102 can be in communication with components (e.g., POS terminals 103) at multiple checkout lanes 100 in one store and/or across multiple different stores. The computing system can also be a cloud service, an edge computing device, and/or any combination thereof.

Referring to the checkout lane 100, the one or more scanning devices 116 can be integrated into the flatbed 114. For example, the flatbed 114 can include one or more cameras or other imaging devices. In such scenarios, the cameras or other imaging devices can be configured to capture image data, such as video, of products as the customer 118 scans such products. The cameras or other imaging devices can also be configured to capture image data, such as video, of the customer 118 as the customer 118 scans products at the checkout lane 100. This image data can be used by the computing system 102, as described further below, to identify scanning motions made by the customer 118. Such image data can also be used to train and/or improve one or more machine learning models that are used to identify the scanning motions. Moreover, the flatbed 114 can include an integrated scale that can be used to weigh products as they are placed on the flatbed 114.

The one or more scanning devices 116 can be barcode, SKU, or other label identifying devices. The scanning devices 116 can also be LiDAR, infrared, and one or more other types of scanning devices and/or flatbed scanners. For example, the one or more scanning devices 116 can include a handheld scanner that the customer 118 can direct towards a label, such as a barcode, attached to a product that the customer 118 is purchasing. The handheld scanner can also include a camera that captures images of the product as it is being scanned by the customer 118. Images captured by the handheld scanner can be used by the computing system 102 to verify whether the customer 118 performs a scanning motion.

The POS terminal 103 can be configured to identify products that are scanned using the one or more scanning devices 116. For example, the POS terminal 103 can receive a scan of a product label from the one or more scanning devices 116. Using the scan of the product label, the POS terminal 103 can determine a price of the product associated with the label. The POS terminal 103 can add the determined price to the customer 118's bill (e.g., transaction, receipt).

Purchase information, such as the customer 118's bill, products that have been scanned, and prices for the scanned products, can be displayed on a display screen 113 at the checkout lane 100. The display screen 113 can therefore output information about the customer 118's transaction. As the customer 118 scans products, prices associated with the products can be outputted in real-time on the display screen 113. The display screen 113 can also provide look-up and search functionality to the customer 118. For example, if the customer 118 is purchasing fresh produce, the customer 118 can input search parameters at the display screen 113 and select a search result and quantity of the selected search result to add to the customer 118's transaction. The display screen 113 can be a touchscreen. When the customer 118 is done scanning products, the customer 118 can complete their purchase by paying at the POS terminal 103.

Sometimes, the POS terminal 103 can be integrated with the display screen 113. The POS terminal 103 can also be in communication with the display screen 113 via the network(s) 106. The display screen 113 can also include an integrated camera 112. Image data captured by the camera 112 can be used to positively and objectively identify the customer 118, especially in scenarios where the computing system 102 determines that the customer 118 did not perform an affirmative scanning motion. The integrated camera 112 can also have a wide FOV 126 such that the camera 112 can capture a view of a surrounding area to provide more context in subsequent image analysis. In some implementations, video data captured by the camera 112 can be used by the computer system 102 to determine whether the customer 118 performs affirmative scanning motions during the checkout process.

The light pole 108 can include a light 109. The light 109 can illuminate the flatbed 114, thereby providing uniform lighting. The uniform lighting can be beneficial for the overhead camera 110 to capture consistent image data of the customer 118's movements as they scan products at the checkout lane 100. With consistent lighting, scanning motions can be more clearly differentiated from an ambient environment and products in the image data. During training of the machine learning models, these scanning motions can be labeled and confidence of such labeling can increase, especially if the models are trained using image data captured from a variety of overhead cameras at checkout lanes that have consistent lighting.

Sometimes, the light pole 108 can also include a camera that faces down over the flatbed 114. The camera can be a high resolution camera and can be configured to capture image data of the customer 118's movement and/or of products as they are scanned by the scanning devices 116 or otherwise passed over the flatbed 114. This image data can also be used by the computing system 102 to identify affirmative scanning motions of the customer 118. This image data can also be used to build a robust training dataset for training and improving one or more machine learning models used for scanning motion identification determinations.

The overhead camera 110 can be positioned over or proximate to the checkout lane 100. For example, the overhead camera 110 can be attached to a ceiling in the store. Therefore, the overhead camera 110 can have a FOV 128, which encompasses the particular checkout lane 100. In some implementations, the FOV 128 can encompass additional checkout lanes. The FOV 128 can encompass two checkout lanes. The FOV 128 can also encompass any other quantity of checkout lanes in the store. The overhead camera 110 can face down to get a top down view of the checkout lane 100. The overhead camera 110 can also be positioned or oriented at an angle to capture more than just the checkout lane 100. For example, the overhead camera 110 can be angled such that the FOV 128 includes an area surrounding the checkout lane 100 where the customer 118 may place a shopping cart, basket, or products to be purchased. Having the surrounding area in the FOV 128 can provide more context around a checkout process at the checkout lane 100.

Figure 2:
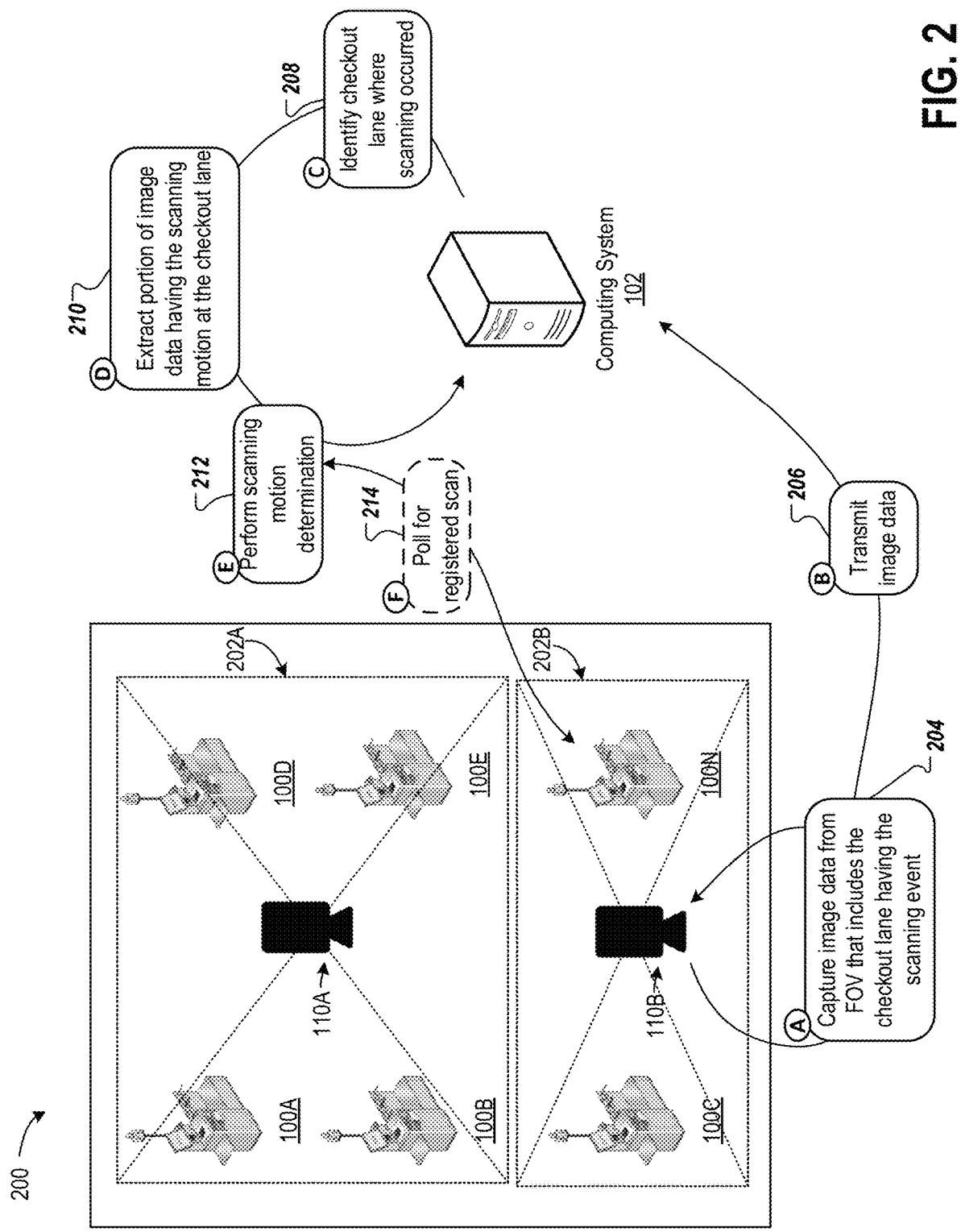
FIG. 2 is a conceptual diagram of a checkout area having multiple overhead cameras.

Sometimes, as depicted in FIG. 2, multiple overhead cameras 110 can be positioned in a checkout area. One overhead camera 110 can then be trained on multiple checkout lanes 100, thereby having a different FOV. The overhead camera 110 can be part of an existing security system in the store. As a result, additional cameras may not need to be installed in the checkout area of the store to perform the techniques described herein, making it easy and inexpensive to deploy the disclosed techniques. The overhead camera 110 can be a low resolution camera. In some implementations, the overhead camera 110 can be high resolution. Moreover, the overhead camera 110 can detect audio, visual, and/or light signals within the FOV 128. The overhead camera 110 can continuously capture image data, such as videos and/or images, of the checkout lane 100. Sometimes, the overhead camera 110 can capture image data of the checkout lane 100 upon detecting a scanning event at the checkout lane 100, such as an optical signal like a flash of a light from one of the scanning devices 116 when a product label is scanned. The overhead camera 110 can also capture image data upon detected an audio signal like a sound from one of the scanning devices 116 and/or the POS terminal 103 when a product scan is registered. The image data can be used to build robust training datasets for training and improving the machine learning models described herein. Regardless of a configuration or arrangement of the overhead cameras 110 across different stores, low resolution image data can be beneficial to improve accuracy of identifying scanning motions using the machine learning models.

To begin the checkout process at the checkout lane 100, the customer 118 can place a shopping basket 124 or shopping cart next to the checkout lane 100. The customer 118 can remove products from the basket 124, such as avocado 120, and pass such products over the flatbed 114 in a direction 132. For example, the customer 118's hand 130 can hold the avocado 120 and move the avocado over and/or in front of the scanning devices 116 on the flatbed 114 in the direction 132. One or more of the scanning devices 116 can scan images of product labels, such as barcode 122 on the avocado 120.

The POS terminal 103 can identify the product associated with the scanned barcode 122. For example, the POS terminal 103 can look up, in a data store such as product information data store 105, a product that corresponds to the scanned barcode. Once the product associated with the barcode 122 is identified, the POS terminal 103 can update the customer 118's bill with a price of the associated product. The updated bill can be outputted on the display screen 113. In the example of FIG. 1, once the barcode 122 is scanned, the POS terminal 103 may identify that an avocado is associated with the scanned barcode 122 by performing a lookup function in the data store 105. As a result, a price associated with the avocado can be outputted at the display screen 113.

The overhead camera 110 can capture image data of the scanning area (step A, 134) as the customer 118 moves the avocado 120 over the flatbed 114. In other words, movement of the hand 130 in the direction 132 can be captured by the overhead camera 110 and transmitted to the computing system 102. As described throughout this disclosure, the overhead camera 110 can continuously capture image data (e.g., video) of the scanning area. In some implementations, the overhead camera 110 can capture image data of the customer 118's movement upon detecting that a checkout process has begun. For example, the customer 118 coming into the FOV 128 of the overhead camera 110 can trigger the camera 110 to capture image data of the customer 118's movements. As another example, the customer 118 can provide input at the POS terminal 103 and/or the display screen 113 that indicates the customer 118 is ready to begin the checkout process. As yet another example, the customer 118 can place the basket 124 on the checkout lane 100 where a sensor is located for detecting presence of the basket 124. Presence of the basket 124 (e.g., weight of the basket 124) can indicate that the customer 118 has products they wish to scan. Thus, the checkout process can begin and the overhead camera 110 can begin capturing image data of the customer 118's movements. One or more other signals can be used to detect that the checkout process has begun.

The computing system 102 receives the image data (step B, 136). The image data can be transmitted in real-time and/or near real-time to the computing system 102. In some implementations, the image data can be transmitted in segments, such as 2 second, 3 second, 4 second, 5 second, 6 second, 7 second, etc. segments. As a result, as the customer 118 continues to perform scanning motions or otherwise scan product labels until the basket 124 is empty, image data is captured and received by the computing system 102 (step B, 136). In some implementations, the image data can be transmitted in batch, for example, once the customer 118 provides some indication at the POS terminal 103 and/or the display screen 113 that they are done scanning products and are ready to complete the transaction.

The computing system 102 can retrieve one or more motion identification models from a models data store 104 (step C, 138). The computing system 102 can retrieve the model(s) at any time before, during, or after image capture by the overhead camera 110 (step A, 134) and receiving the image data (step B, 136). In some implementations, the computing system 102 can locally store the model(s) such that during runtime, the computing system 102 may not have to retrieve the model(s) from the data store 104.

The computing system 102 can identify scanning motion(s) from the image data based on applying the model(s) (step D, 140). The computing system 102 can analyze the image data, such as processing the image data into segments (e.g., 2 seconds, 3 second, 4 seconds, 5 seconds, 6 seconds, 7 seconds, etc. segments). Each of the segments can be provided as input to the model(s). The model(s) can be trained to identify scanning motions in the video segments and assign confidence values to those identified scanning motions. If the identified scanning motion has a confidence value that exceeds some predetermined threshold level, the computing system 102 can determine that the customer 118 performed an affirmative scanning motion in step D (140). If, on the other hand, the identified scanning motion has a confidence value that is less than the predetermined threshold level, the computing system 102 can determine that the customer 118 likely did not scan the barcode 122 of the avocado 120 and is engaging in suspicious activity, such as theft of the avocado (step D, 140).

The computing system 102 can store the scanning motion identification in the product information data store 105 (step E, 142). This identification can be used as part of a feedback loop to continuously train and improve accuracy of the model(s). This identification can also be used for additional processing and analysis by the computing system 102, another computing system, and/or in-store employees, such as safety and security personnel.

Optionally, the computing system 102 can verify the identified scanning motion from step D (140) with a registered scan (step G, 146). For example, the computing system 102 can poll the POS terminal 103 for registration of some scanning event within a predetermined period of time (e.g., half a second, 1 second, etc.) from when the image data of the customer 118's hand 130 moving the avocado 120 in the direction 132 was captured by the overhead camera 110 (step F, 144). As another example, the computing system 102 can process the image data that was received in step B (136) and determine whether an optical signal is present within the predetermined period of time in the image data. A flash of green light from the POS terminal 103 and/or the scanning devices 116 can, for example, indicate that a positive scan occurred. A flash of red light, on the other hand, can indicate a missed scan. As yet another example, the computing system 102 can process the image data to determine whether an audio signal is present within the predetermined period of time in the image data. A chime from the POS terminal 103 and/or the scanning devices 116 can indicate that a positive scan occurred. One or more other techniques can be used to validate whether the scanning motion corresponds with a registered scan in step G (146).

The computing system 102 can also optionally output scanning motion results (step H, 148). The computing system 102 can output the results when the computing system 102 cannot verify the scanning motion with a registered scan in step G (146). The computing system 102 can also output the results when the scanning motion is verified in step G. Sometimes, the computing system 102 may output the results without performing the step G (146). For example, if the computing system 102 identifies scanning motion in step D (140) having a confidence level that is less than the predetermined threshold level, then the computing system 102 can provide output at the display screen 113 and/or the POS terminal 103. The output can include an indication that the customer 118 missed a scan of the avocado 120. The output can also include preventing the customer 118 from completing the transaction and/or trying to scan other products in the basket 124. The computing system can also provide output to a user device of an in-store employee 150, such as safety and security personnel. The output can indicate that the customer 118 likely did not scan the barcode 122 for the avocado 120. The output can indicate a likelihood that the customer 118 is stealing or has stolen the avocado 120. The output can also include one or more segments of the image data from the overhead camera 110 that can be further analyzed and reviewed by the in-store employee 150. The in-store employee 150 can make a determination of whether to apprehend the customer 118 before they complete the transaction or leave the store and/or whether to monitor the customer 118 when and if they return to the store in the future. The in-store employee 150 can also make other determinations of how to respond to the customer 118's suspicious behavior. Such determinations can be based on a gravity of the suspicious behavior (e.g., the in-store employee 150 may apprehend the customer 118 if, upon reviewing the image data, it appears that the customer 118 is faking scanning an expensive item, like electronics). One or more other outputs are also possible.

In some implementations, the computing system 102 can first poll the POS terminal 103 for a registered scan (step F, 144). If the POS terminal 103 registered a scanning event, then the computing system 102 may not have to identify scanning motion from the image data within a threshold block of time in which the POS terminal 103 registered the scanning event (e.g., 1 second, half a second, etc. before the POS terminal 103 registered the scanning event). The computing system 102 can continuously poll the POS terminal 103 until the POS terminal 103 does not register a scanning event. Then, the computing system 102 can analyze the image data received from the overhead camera 110 in steps D-H (140-148). In some implementations, the overhead camera 110 may not transmit the image data to the computing system 102 until the computing system 102 determines that the POS terminal 103 did not register a scanning event. This can be beneficial to avoid clogging network bandwidth and computational resources.

Moreover, in some implementations, identifying the scanning motions in step D (140) can be performed close to real-time such that the computing system 102 can determine whether to get the in-store employee 150 involved and/or whether to transmit output to the display screen 113 to prompt the customer 118 to try scanning the avocado 120 again.

In some implementations, the computing system 102 can request the camera 112 embedded in the display screen 113 to capture image data of the customer 118 based on determining that the customer 118 did not perform an affirmative scanning motion. This image data can be transmitted to the device of the in-store employee 150 such that the employee can utilize the image data to objectively identify the customer 118. Transaction data (e.g., customer ID, government-issued ID, credit card or other payment information, phone number, email address, etc.) that is logged at the POS terminal 103 and/or the display screen 113 can also be transmitted to the in-store employee 150's device and used to objectively identify the customer 118.

Steps B-H may be performed by the computing system 102 in real-time for each product as the product is scanned at the checkout lane 100. One or more of the steps B-H can also be performed at one time after all the products are scanned at the checkout lane 100. One or more of the steps B-H can also be performed at different times throughout the checkout process.

FIG. 2 is a conceptual diagram of a checkout area 200 having multiple overhead cameras 110A-B. The checkout area 200 can have any number of overhead cameras. The number of overhead cameras can also vary from store to store and/or based on a size of the checkout area 200. In the example checkout area 200 in FIG. 2, overhead camera 110A has a FOV 202A that includes checkout lanes 100A, 100B, 100D, and 100E. Overhead camera 110B has a FOV 202B that includes checkout lanes 100C and 100N. Other configurations are also possible. For example, as depicted in FIG. 1, one overhead camera is trained on one checkout lane. As other examples, each overhead camera can be trained on an equal number of checkout lanes and/or checkout lanes that appear in series (e.g., down a line). As an illustrative example, the overhead camera 110A can be trained on the checkout lanes 100A, 100B, and 100C while the overhead camera 110B can be trained on the checkout lanes 100D, 100E, and 100N.

During a checkout process, a customer can scan products at any of the checkout lanes 100A-N, such as the checkout lane 100N. The camera 110B, which has the FOV 202B that includes the checkout lane 100N, can capture image data that includes the checkout lane 100N where the customer is scanning products (step A, 204). The image data can include the checkout lane 100N where the scanning event was detected. Since the FOV 202B covers a portion of the checkout area 200 rather than just one of the checkout lanes 100A-N, the image data may also include the checkout lane 100C and any other checkout lanes that appear in the FOV 202B of the camera 110B. The camera 110B can then transmit the image data to the computing system 102 (step B, 206).

Upon receiving the image data, the computing system 102 can identify which checkout lane the scanning event is taking place (step C, 208). For example, the computing system 102 can receive one or more event-based timestamps (e.g., which can be part of transaction information, such as a current bill of the customer) from a POS terminal at the checkout lane 100N. The event-based timestamp can indicate a time at which a product was scanned. If the event-based timestamp is within a threshold block of time from scanning motion at the checkout lane 100N that is depicted in the image data, the computing system 102 can identify the checkout lane 100N. As another example, the computing system 102 can identify optical and/or audio signals in the image data indicative of a scanning event that comes from a portion of the FOV 202B having the checkout lane 100N.

Once the computing system 102 identifies the checkout lane 100N as being the location where the scanning event was detected, the computing system 102 can extract a portion of the image data having the scanning motion at the checkout lane 100N (step D, 210). The computing system 102 can use one or more image processing and/or image extraction techniques to select the portion of the image data that depicts the checkout lane 100N and, more particularly, the scanning motion(s) of the customer. The computing system 102 can also use one or more machine learning models that are trained to extract only the customer's movement (e.g., the customer's arms, hands, and/or torso) from the image data and use that extracted portion of the image data for further processing described throughout this disclosure. Although the image data may be lower resolution (e.g., because the overhead cameras 110A-B are low resolution cameras, because the camera 110B has a wide FOV 202B and the product appears small in the captured image data, etc.), the computing system 102 can be trained to accurately identify products from low resolution image data.

The computing system 102 can then perform scanning motion identification determinations using the extracted portion of the image data (step E, 212). As described throughout, the computing system 102 can determine whether the customer performed an affirmative scanning motion, faked a scanning motion, forgot to scan the product, and/or performed an accidental missed scan. Optionally, the computing system 102 can also poll components of the checkout lane 100N, such as the POS terminal, for indication of a registered scanning event (step F, 214). If a scan was registered at the checkout lane 100N, the computing system 102 can verify/validate that the customer performed an affirmative scanning motion. This feedback can be beneficial to continuously improve and train the models that are used for identifying scanning motions in the image data. Step F can be performed before, during, or after the scanning motion determination in step E (212).

If the computing system 102 determined that the customer did not perform an affirmative scanning motion in step E (212) and/or a scanning event was not registered in step F (214), then the computing system 102 can determine that the customer engaged in suspicious activity, such as theft. As described throughout this disclosure, such a determination can be used by the computing system 102 to generate output that is presented at a component of the checkout lane 100N, such as a display screen, and/or a user device of in-store employees, such as safety and security personnel.

Figure 3A:
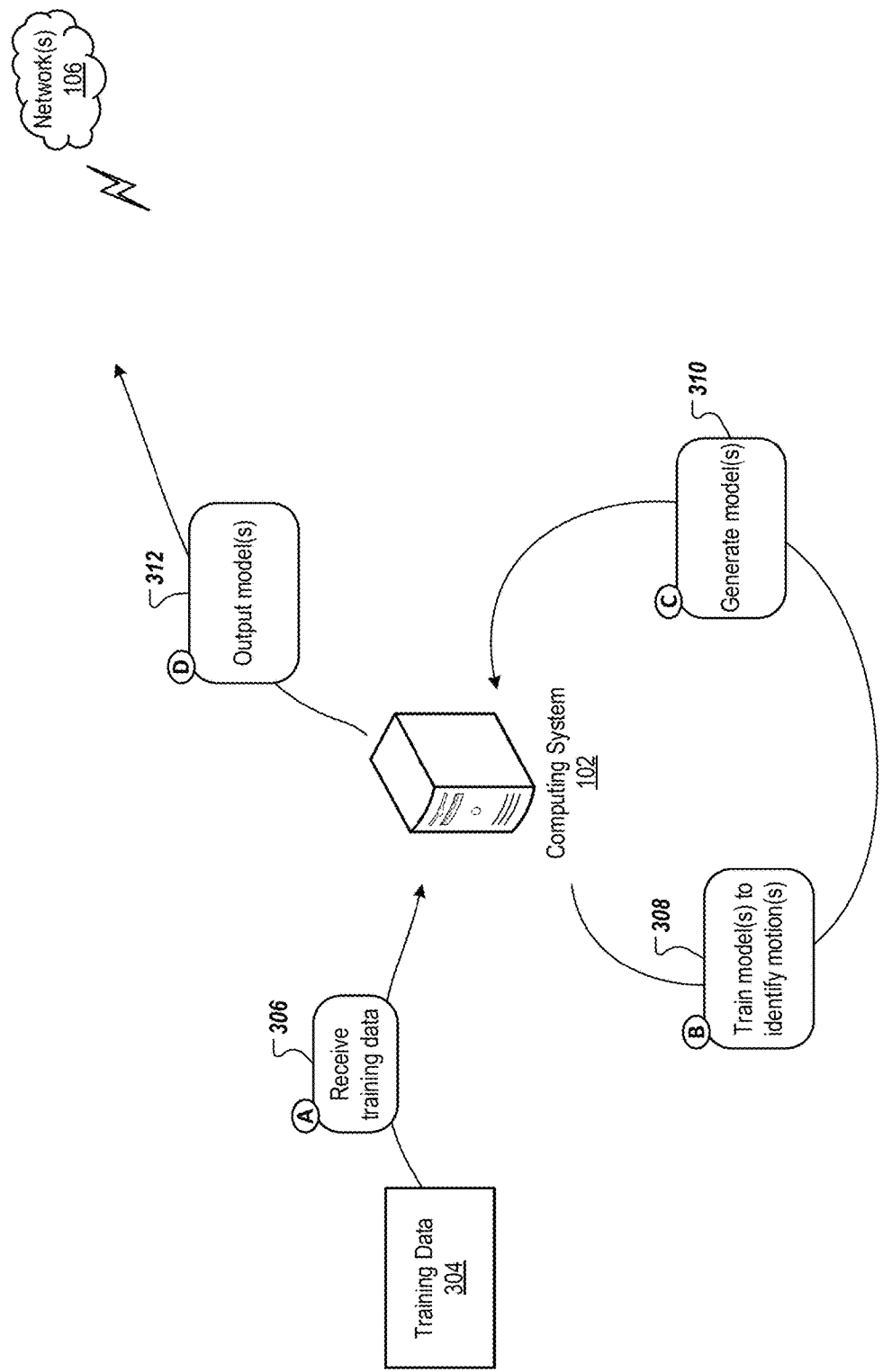
FIG. 3A is a conceptual diagram for training motion identification models using machine learning techniques.
Figure 3B:
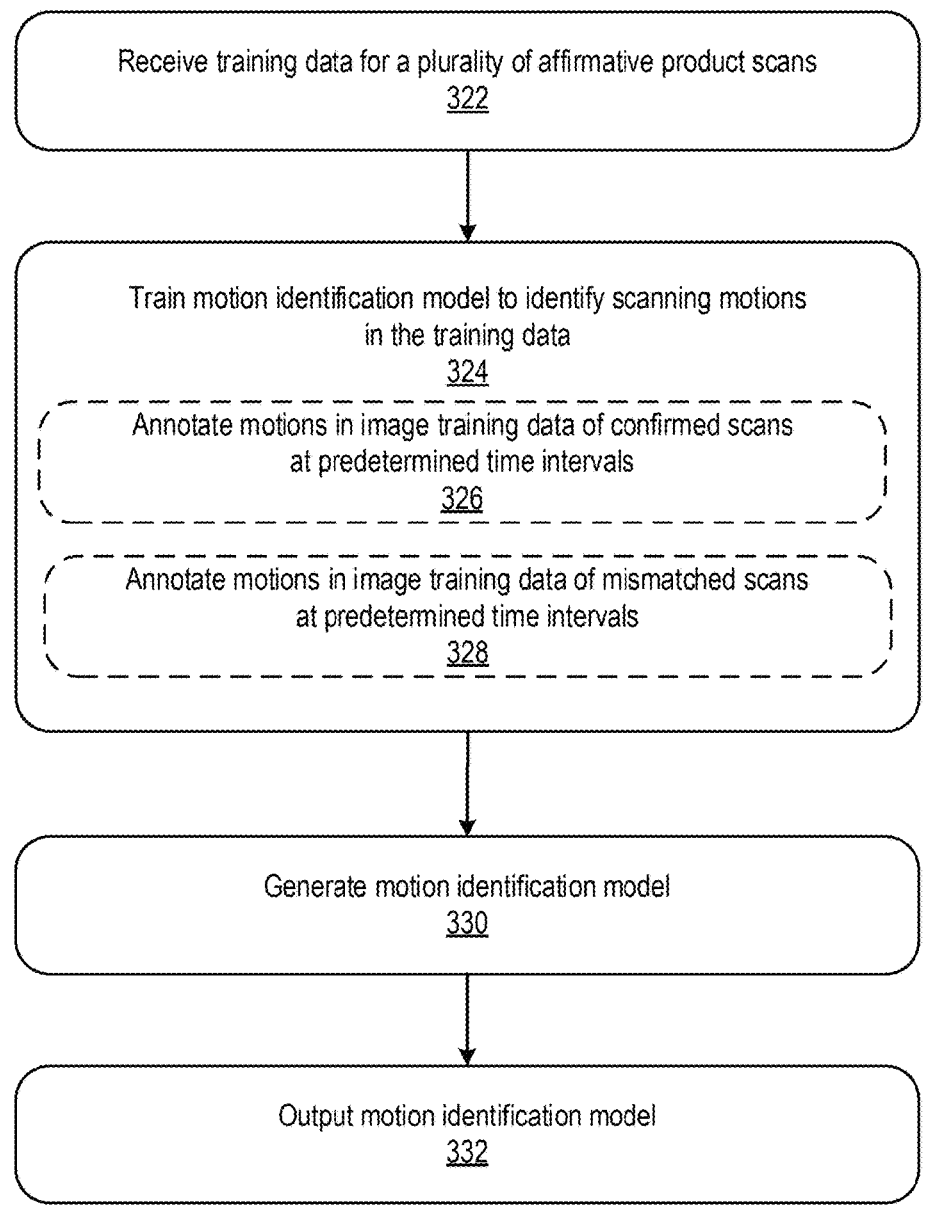
FIG. 3B is a flowchart of a process for training motion identification models using machine learning techniques.

FIG. 3A is a conceptual diagram for training motion identification models using machine learning techniques. FIG. 3B is a flowchart of a process 320 for training motion identification models using machine learning techniques. Referring to both FIGS. 3A-B, the process 320 for training the models can be performed by the computing system 102. One or more other computing systems can also be used to train the models. Such computing systems can be different than the computing system 102. The computing system 102 and/or the other computing systems can be a remote computing system, server, network of computers or servers, cloud service, and/or edge computing device.

The computing system 102 can receive training data 304 (step A, 306 in FIG. 3A, block 322 in FIG. 3B). The training data 304 can indicate a plurality of affirmative product scans. The training data 304 can include image data such as video feeds and/or segments of video depicting different scanning motions made by customers at checkout lanes across one or more stores. This scanning motions can be correlated to other training data 304 indicating that product scans were in fact made. Thus, the training data 304 can also include positive scan information made by scanning devices and/or POS terminals at the checkout lanes. The training data 304 can also include other forms of data, such as transaction history (e.g., receipts), payment information, and/or input provided by the customer at a touch screen or other display screen that indicate affirmative scans. The training data 304 can also include, in some implementations, motions that are not correlated with affirmative product scans to further improve the model(s) ability to accurately detect motions that correspond to affirmative product scanning. Using an abundance of robust training data can be beneficial to train the model(s) to accurately detect affirmative scanning motions in image data.

Moreover, the image training data can include image data that is captured by similar devices. The similar devices can be a plurality of overhead cameras that are installed in checkout areas across different stores. The plurality of overhead cameras can be installed in similar or same positions in the checkout areas. The plurality of overhead cameras can capture image data at a same resolution (e.g., 200×200) as well as a same angle and/or FOV. The computing system 102 can therefore train the model(s) using consistent and uniform, low resolution image data, thereby increasing accuracy of motion identification by the model(s). For example, the computing system 102 can receive all images of customer motion that were captured by the overhead cameras 110 (e.g., refer to FIGS. 1-2) at different checkout lanes in the network of stores. These images can all have uniform and consistent FOV and lighting, thereby making training easier and model performance more accurate. Sometimes, each checkout area can have a different configuration of the plurality of overhead cameras. Regardless, the computing system 102 can still use images captured by the overhead cameras that are arranged in different configurations to train the model(s).

The computing system 102 can also receive images of customer motion from devices that are not similar. The computing system 102 can receive images of motions that were captured by one or more cameras that are positioned at or otherwise part of a checkout lane. For example, the computing system 102 can receive image data from the camera 112 embedded in the display screen 113, a camera configured to a handheld scanning device 116, a camera positioned or otherwise attached to the light pole 108, a camera embedded in the flatbed 114, etc.

The computing system 102 can also receive image training data that includes images captured by depth sensing cameras and/or thermal cameras. Images captured by the depth sensing cameras can be advantageous to determine placement and positioning of products relative to features in an ambient environment, including components of the checkout lane (e.g., the flatbed 114, the one or more scanning devices 116, etc.) and parts of a customer's body (e.g., the customer 118's hand 130, arms, etc.). The depth sensing cameras can include LiDAR technology. The depth sensing cameras can be configured to emit infrared light and to generate a depth map depicting depth of field and relativity of product positioning and placement. The thermal cameras capture images that can be used to generate heat maps. Using such heat maps, the computing system 102 can train the model(s) to detect differences between customer hands (which are warmer than products) and products (which are colder than human body parts).

The computing system 102 can train motion identification models to identify scanning motion(s) using the training data 304 (step B, 308 in FIG. 3A, blocks 324-328 in FIG. 3B). For example, the computing system 102 can annotate motions in image training data of confirmed scans at predetermined time intervals (block 326 in FIG. 3B). The computing system 102 can also annotate motions in image training data of mismatched scans at predetermined time intervals (block 328 in FIG. 3B). The image training data can be compared to POS data to determine whether motion depicted in the image training data corresponds to an actual scan of a product. The POS data can indicate registration of a scanning event at a particular point in time. The computing system can then determine whether the point in time of the registered scanning event falls within some threshold period of time that the image training data depicting the motion was captured. If the registered scanning event occurred within the threshold period of time, the computing system 102 can annotate/label/classify the motion in the image training data as an affirmative scanning motion. For example, if the POS terminal registered a scan half a second after a motion is depicted in the image training data, the computing system 102 can identify that motion as an affirmative scanning motion. On the other hand, if the POS terminal registered a scan several seconds after a motion is depicted in the image training data, the computing system 102 may determine that the motion is not a scanning motion. Instead, as an example, the motion may be a random motion made by the customer.

The computing system 102 can then train the model(s) to identify motions that correlate to confirmed scans as affirmative scanning motions and motions that correlate to mismatched scans as missed scanning motions. In other words, the model(s) can be trained to differentiate scanning motions from non-scanning motions in real-time without also having to correlate such motions to POS transaction data or other data.

In some implementations, the computing system 102 can train the model(s) to identify portions of the image data that should be excluded from analysis for the scanning motions determination. For example, the model(s) can be trained to identify a hand, fingers, arm, clothes, skin tone, and/or gloves that can be further analyzed to determine whether the customer makes a scanning motion. The model(s) can be trained to identify a product in the customer's hand(s) and extract the product so that the model(s) can analyze the customer's body movement for scanning motions. The model(s) can also be trained to extract background or other ambient features that may appear in the image data, such as the flatbed scanning area, scanning devices, other checkout lanes, other customers, etc.

In some implementations, the computing system 102 can also train the model(s) to identify other motions and anomalies that may be indicative of theft behavior. For example, the computing system 102 can train the model(s) to identify motion cadence within one or more threshold lengths of time and classify the cadence as theft behavior or normal behavior. For example, a scanning motion that has a fast cadence (e.g., 1 second to scan the product) may indicate that the customer likely is engaging in theft behavior. Typically, a customer may scan a product more slowly or pause to ensure that the product is properly scanned before moving to the next product. Therefore, the computing system 102 can also train the model(s) to identify pauses in motion and classify such pauses as relating to theft behavior or normal behavior. For example, if the customer pauses for 3 or more seconds (or some other predetermined length of time) between scanning one product and another, the computing system 102 can determine that the customer performed an affirmative scanning motion immediately before the customer paused. The computing system 102 can accordingly train the model(s) to identify the motion immediately before the customer paused as a scanning motion.

The model(s) can be trained to identify other behavior that may be typical during a checkout process, including but not limited to placing products on a conveyor belt or on a platform next to the flatbed scanning area, picking up and putting down products, moving the body around the checkout area, selecting options on a touch screen display at the checkout lane, picking up a handheld scanning device and moving it over or near a product, putting products in a bag, reaching into a bag or pocket to grab money/wallet, scanning information presented on a mobile phone or other mobile device, etc. By training the model(s) to identify such behavior, the model(s) can more accurately detect and differentiate affirmative scanning motions from other behavior that is typical during the checkout process but may not necessarily involve scanning products for purchase.

Training the model(s) to identify scanning motions can include training the model(s) to generate a probability that a scanning motion took place. The probability can be a percent value, a confidence level, or some other value (e.g., numeric, Boolean, string, etc.). The probability, for example, can be a value within a range of values, such as 1-100, where 100 is a highest probability that the customer performed a scanning motion and 1 is a lowest probability that the customer performed a scanning motion. In some implementations, the computing system 102 can train the model(s) to generate the probability value based on how close the customer's movement is to a scanning area at the checkout lane. For example, the closer the customer's movement appears to the scanning area (e.g., a scanning device), the higher probability that the customer performs an affirmative scanning motion. The farther away the customer's movement appears relative to the scanning area (e.g., the scanning device), the lower probability that the customer performs an affirmative scanning motion.

The computing system 102 can also train different models for different types of motion, stores, checkout lanes, etc. For example, one or more models can be trained to identify scanning motions during a summer season, when customers wear less clothes and their movements appear more apparent in the image data. One or more models can also be trained to identify scanning motions during a winter season, when customers wear more clothes, such as parkas or many layers. The clothes may obscure some movements or other scanning motions made by the customers. Different models can also be trained based on store configuration/layout, equipment used in the store (e.g., resolution of cameras, quantity of cameras, location of cameras, etc.), lighting, etc. Models can be generated and deployed for a particular store or stores. Models can also be generated and deployed across a network of stores.

The computing system 102 can train the model(s) using one or more machine learning techniques, including but not limited to convolutional neural networks (CNNs), decision trees, regression methods, classification algorithms, clustering algorithms, and/or one or more other supervised/unsupervised training methods.

Once training is complete, the computing system 102 generates the model(s) (step C, 310 in FIG. 3A, block 330 in FIG. 3B). The computing system then outputs the motion identification model(s) (step D, 312 in FIG. 3A, block 332 in FIG. 3B). Outputting the model(s) can include storing the model(s) in a data store, such as the models data store 104 (e.g., refer to FIGS. 1, 7). Outputting the model(s) can also include deploying the model(s) for use in identifying scanning motions in one or more stores and/or network of stores. The computing system 102 can utilize the model(s) during runtime to identify scanning motions during checkout processes (e.g., refer to FIGS. 4A-B). In some implementations, where multiple computing systems are used to identify scanning motions across one or more stores, each of the computing systems can receive and utilize the model(s).

Figure 4A:
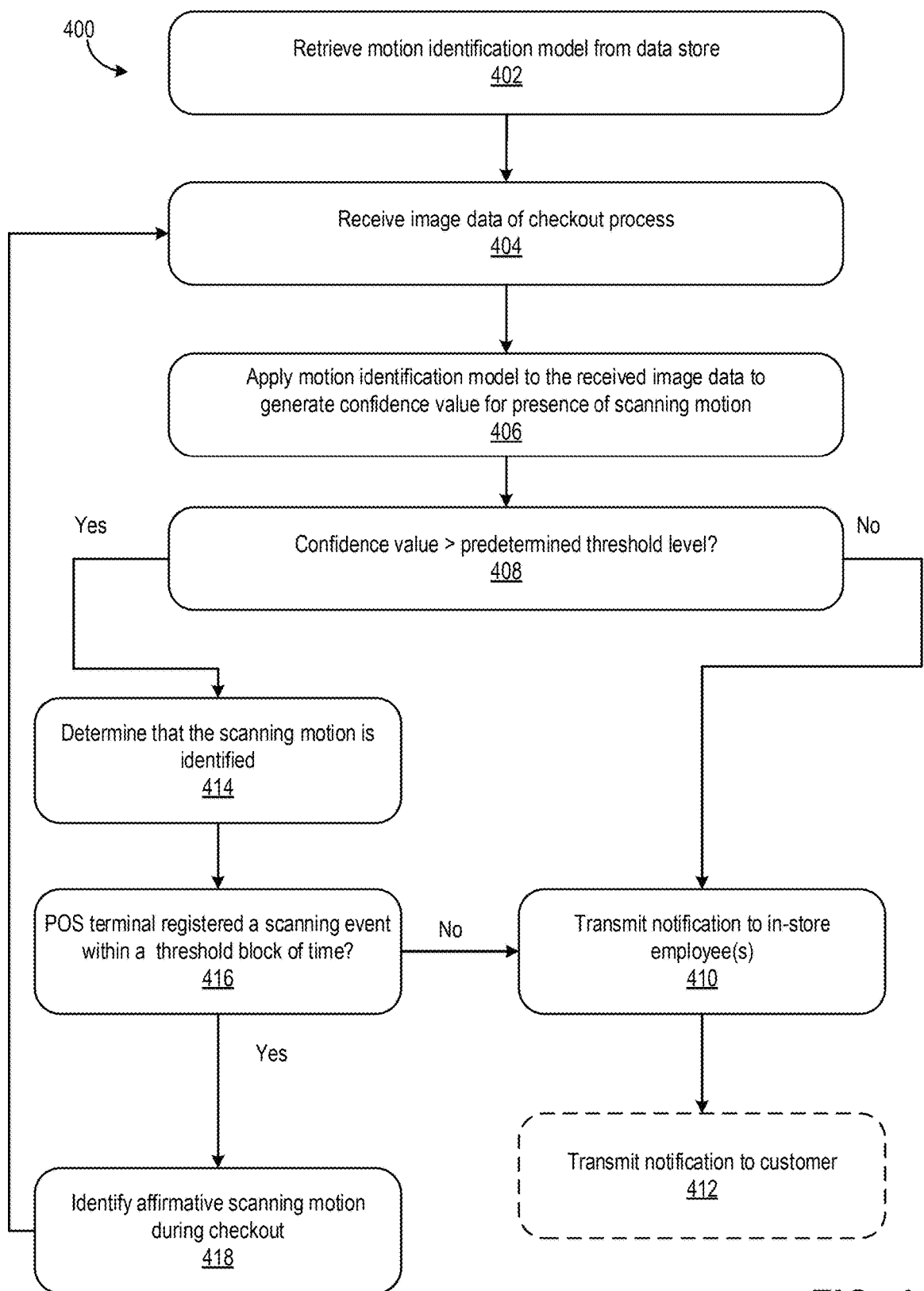
FIG. 4A is a flowchart of a process for identifying scanning motions in image data using a motion identification model.
Figure 4B:
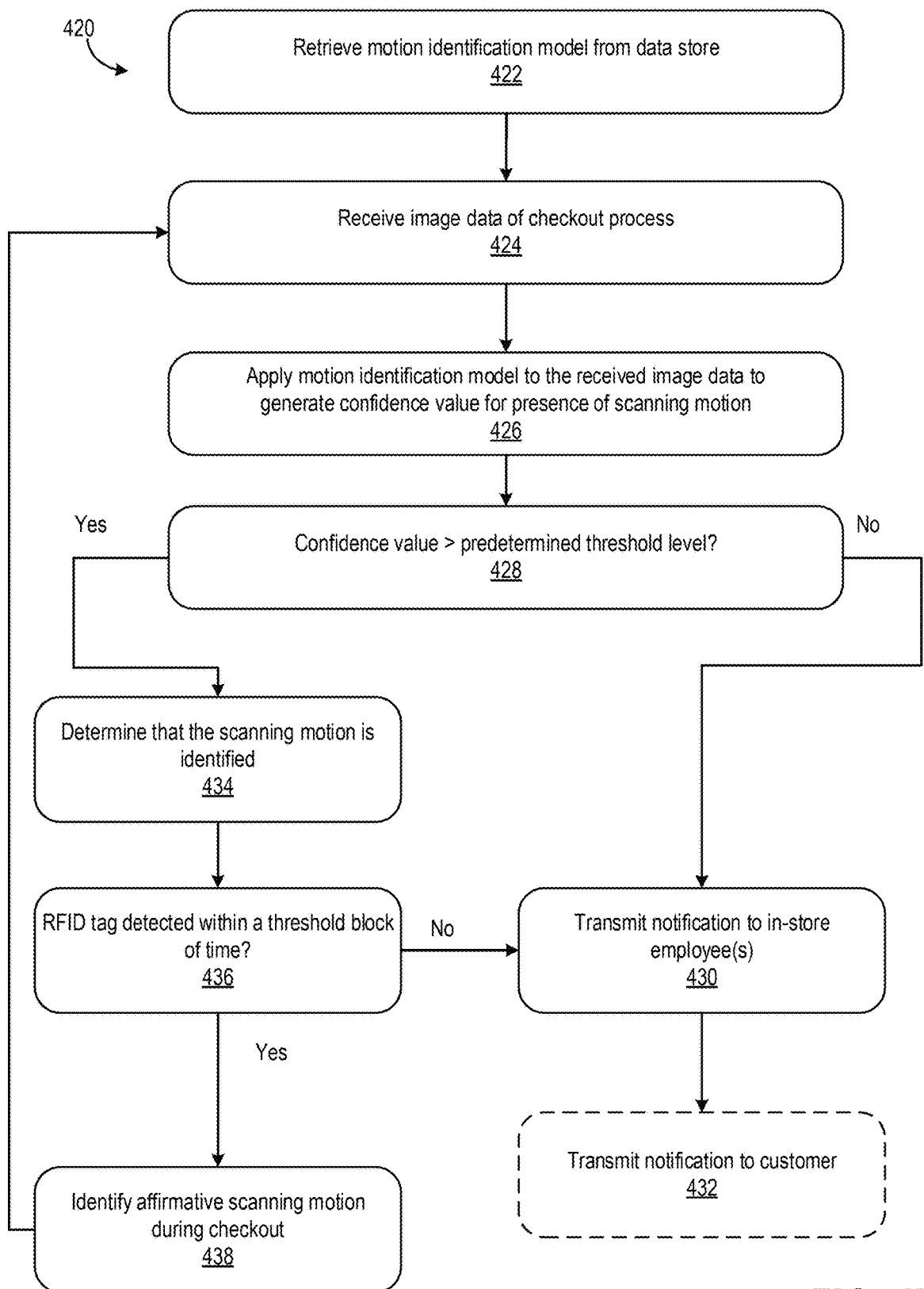
FIG. 4B is a flowchart of another process for identifying scanning motions in image data using the motion identification model.

FIG. 4A is a flowchart of a process 400 for identifying scanning motions in image data using a motion identification model. FIG. 4B is a flowchart of another process 420 for identifying scanning motions in image data using the motion identification model. The processes 400 and 420 can be performed by the computing system 102. Sometimes, the overhead camera 110 can be integrated with or otherwise part of the computing system 102. Thus, the processes 400 and 420 can be performed by the overhead camera 110 and the computing system 102. One or more blocks in the processes 400 and 420 can also be performed by one or more other computing systems, servers, devices, cloud services, and/or edge computing devices. For illustrative purposes, the processes 400 and 420 are described from a perspective of a computing system.

Referring to the process 400 in FIG. 4A, the computer system can retrieve one or more motion identification models from a data store (402). As described in FIGS. 3A-B, the motion identification models can be trained to identify scanning motions in image data and assign confidence values to those identified motions. Once the models are trained, they can be stored in the data store (e.g., the models data store 104). The computer system then retrieves the models. The computer system can select which models to retrieve based on one or more criteria. For example, the computer system can select one or more models that are generated for a particular store. Each store can have a set of motion identification models, which can be trained using image training data of positive scans that were detected at the store and annotated as positive scans. The models per store can also be based on a particular configuration of equipment in the store. For example, a store having one overhead camera per checkout lane can have different models than a store having one overhead camera per multiple checkout lanes. As another example, the computer system can select one or more models that are generated for a particular lighting scheme in the store, configuration of cameras in the store, and/or type of equipment used in the store. The computer system can also select one or more models that are generated for a particular season. For example, one or more models can be trained to identify body movement during the winter season, when customers wear layers of clothes and their movements may be obscured by parkas and other clothing. One or more models can also be trained to identify body movement during the summer season, when customers wear less clothes and their movements are not obscured by layers of clothing.

In some implementations, one or more of the models can be stored in local memory at the computer system. Moreover, in some implementations, block 402 can be performed later in the process 400, such as after block 404 described below.

The computer system can receive image data of a checkout process in 404. As described previously in FIGS. 1-2, an overhead camera can continuously capture image data, such as video data, at a checkout lane. The image data can be transmitted to the computer system in real-time or near real-time. Transmitting the image data in real-time or near real-time can be advantageous to provide in-store employees with an opportunity to intervene if the customer is identified as not performing an affirmative scan (e.g., the customer is likely engaging in theft or some other suspicious activity). Thus, the in-store employees may apprehend the customer before they exit the store and/or even complete the transaction.

The image data can be transmitted in segments or slices, such as in 2 second, 3 second, 4 second, 5 second, 6 second, 7 second, etc. segments. Transmitting the image data in segments can be beneficial to reduce clogging of network bandwidth. Transmitting the image data in segments can also reduce how much computational resources are used since smaller packets of data are being transmitted and processed rather than entire streams of image data.

In some implementations, the image data can be transmitted in batch, for example once the customer pauses in scanning products (e.g., the customer pauses for over a predetermined period of time, such as 3 seconds), once the customer provides input at the POS terminal indicating that the customer is done scanning items, and/or once the customer provides payment information at the POS terminal. In yet some implementations, image data for a plurality of checkout lanes can be transmitted and processed in batch at predetermined times, such as every thirty minutes, every hour, every two hours, every three hours, etc.

In 406, the computer system can apply the model(s) to the received image data to generate a confidence value for presence of a scanning motion. In some implementations, the image data can depict multiple body movements of the customer, all of which can be identified using the model(s). Each of the identified body movements can then be assigned a confidence value. In some implementations, the computer system can slice the image data into predetermined segment lengths (e.g., 7 second segments) to be provided as input to the model(s). The model can then identify any body movements in the segment of the image data and assign confidence values to those body movements.

For example, the customer may raise their hand to their face in the segment of the image data. The model can identify this as a body movement but may assign this movement a low confidence value, such as 10% on a scale of 0% to 100%, where 0% is least likely to be a scanning motion and 100% is most likely to be a scanning motion. As another example, the customer may move their hand in a direction from left to right in front of a flatbed scanner as if they are scanning a product, but may not actually be holding a product. The model can identify this body movement and assign a medium confidence value, such as 60%. This confidence value may be assigned because the customer is performing an action that typically is a scanning motion, however the computer system did not detect a product in the customer's hand.

As yet another example, the customer may move their hand in a direction from left to right in front of the flatbed scanner while holding a product, but they may move very slowly. The computer system can identify this body movement as a scanning motion and can assign a high confidence value using the model, such as 95%. If, on the other hand, the customer made the same body movement but very quickly (e.g., in a period of time that is less than some predetermined threshold length of time, such as 1 second, 3 seconds, etc.), the computer system can assign a confidence level that is less than 95% because the fastness of the movement may make it less obvious of whether the customer performed an affirmative scanning motion. After all, the model can be trained to assign the confidence value based on cadence/speed of identified movements. The faster the cadence/speed, the lower the confidence value while the slower the cadence/speed, the higher the confidence value.

The computer system can determine whether the confidence value is greater than a predetermined threshold level (408). The predetermined threshold level can be a high value, such as 80%, 85%, 90%, 95%, 100%, etc. on a 0% to 100% scale. The threshold level can be high so that any possibility of false scanning motion can be addressed/analyzed further. This can be beneficial to prevent theft or other suspicious activity in the store.

If the confidence value is less than the predetermined threshold level, the computer system can transmit a notification to a user device of an in-store employee (e.g., safety and security personnel) in 410. The notification to the in-store employee can include the image data and/or a segment of the image data depicting the customer's body movement (e.g., the identified scanning motion). The notification can include a prompt or other message recommending the employee to review the image data. The in-store employee can review the image data and make a determination of whether to stop/apprehend the customer before completing the checkout process or before leaving the store. The in-store employee can also determine whether to merely monitor the customer in the future, when they return to the store. For example, the customer can be added to a watch list or other database/list.

The computer system can also optionally transmit a notification to the customer at the checkout lane in 412. The notification can prompt the customer to rescan the product. The notification can also temporarily freeze or stop the transaction so that the customer may not continue scanning products or provide payment information at the POS terminal. One or more other notifications are also possible.

In some implementations, the computer system can determine whether to transmit the notification to the in-store employee, the customer, or both, based on how much the confidence value deviates from the predetermined threshold level. For example, if the confidence value scale is 0% to 100% and the confidence value is greater than 0% but less than 50%, the computer system can determine that the notification should be sent to the in-store employee (410). After all, the confidence that the customer performed a scanning motion is so low that the in-store employee should review the image data and decide whether to intervene and stop the customer from leaving the store or just continue to monitor the customer. On the other hand, if the confidence value is greater than 50% but less than the predetermined threshold level (e.g., 90%), then the computer system can determine that the notification should be sent to the customer (412). The customer may likely be performing a scanning motion but did not move the product close enough to scanning devices in the flatbed area, as an example.

Referring back to block 408, if the computer system determines that the confidence value is greater than the predetermined threshold level, the computer system can determine that the scanning motion has been identified in the image data (414). In other words, the computer system can flag the image data as depicting an affirmative scanning motion. This indicates that the customer likely did not engage in theft or other suspicious activity.

Next, the computer system can determine whether the POS terminal registered a scanning event within a threshold block of time in 416. Block 416 can be optional. Block 416 can be performed to validate the determination that the scanning motion was identified in 414. The threshold block of time can be some amount of time immediately following the identified scanning motion in the image data. For example, if in a 7 second video segment the scanning motion was identified with a high confidence at the 4 second point, the computer system can determine whether the POS terminal registered the scanning event between the 4$^{th}$ and 7$^{th}$ seconds of the segment, a 3 second threshold block of time immediately following the scanning motion. Typically, the POS terminal can register the scanning event within the threshold block of time from when the scanning motion was made by the customer. The threshold block of time can be any length of time that may be used to scan and register the scanning event by the POS terminal or other similar technology/equipment. For example, the threshold block of time can be half a second, 1 second, 2 seconds, 3 seconds, etc. immediately following the scanning motion and/or including the scanning motion.

As described throughout this disclosure, the POS terminal can register the scanning event in a variety of ways. For example, the POS terminal or one of the scanning devices at the checkout lane can emit an optical or other light signal upon a successful product scan. The optical signal can be a flash of a light and/or a green light. The optical signal can be detected, by the computer system, in the video segment, within the threshold block of time immediately following the identified scanning motion. As another example, the POS terminal or one of the scanning devices at the checkout lane can emit an audio signal upon a successful product scan. The audio signal, such as a chime, can be detected by the computer system in the video segment, within the threshold block of time immediately following the identified scanning motion. As yet another example, the POS terminal can register a scanning event based on identifying the scanned product and updating a transaction (e.g., bill) for the customer with a price of the product. The POS terminal can transmit the transaction data to the computer system in block 416. The computer system can also ping or poll the POS terminal for the transaction data and determine whether an update to the bill (such as adding the price of a scanned product) was made within the threshold block of time. As another example, clocks of the POS terminal, scanning devices, overhead camera, and computer system can be synced using a network protocol. Thus, the computer system can poll one or more of the POS terminal and scanning devices to determine whether a scan occurred/was registered at a particular time (e.g., half a second, 1 second, 2 seconds, etc. after the scanning motion occurred in the video segment). The computer system can also poll the POS terminal and/or scanning devices to determine at what time a scan was registered. The computer system can then compare the time of the scan to the time in the video segment where the scanning motion was identified to determine whether the scan corresponds to the scanning motion.

If the POS terminal registered the scanning event, then the computer system can identify an affirmative scanning motion during checkout in 418. Thus, the computer system can determine that it correctly identified the customer as performing a scanning motion. This identification can be provided as part of a feedback loop for continuously training and improving the model(s) used to identify scanning motions in image data. This identification also indicates that the customer is not engaging in any suspicious activity, such as theft. Accordingly, the customer does not need to be apprehended or monitored at a current time or in the future if the customer returns to the store. The process 400 can then return to block 404 and repeat until the customer completes the checkout process. In other words, the computer system can continuously review the image data to identify any other scanning motions made by the customer and determine whether such scanning motions are indicative of theft or other suspicious activity.

If the POS terminal did not register the scanning event in 416, then the computer system can proceed to block 410 and transmit notification to the in-store employee(s). In other words, the computer system was not able to verify/validate the identification of the scanning motion with data from the POS terminal. It may be likely that the computer system inaccurately identified the scanning motion and/or the POS terminal made an error in registering the scanning event. The in-store employee(s) can therefore review the video segment and determine whether to intervene (e.g., apprehend the customer during the checkout process and/or before leaving the store) or monitor the customer (e.g., at a current time and/or at future times if the customer returns to the store).

In some implementations, the computer system can perform block 416 before applying the motion identification model to the image data in block 406. For example, the computer system can first determine whether the POS terminal registered a scanning event. If the POS terminal registered a scanning event, then a segment of the image data that is within some threshold block of time immediately prior to and/or including the scanning event registration need not be analyzed by the computer system. After all, if a scanning event was registered, the computer system does not need to determine whether the customer performed a scanning motion. This can be advantageous to more efficiently utilize computation resources at the computer system. As another example, the computer system can perform block 416 before receiving the image data in block 404. Thus, the computer system can first determine whether a scanning event was registered. If the scanning event was not registered, then the computer system can request the image data from the overhead camera. This can be advantageous to reduce clogging of network bandwidth and to efficiently utilize available computational resources.

Referring to the process 420 in FIG. 4B, the computer system retrieves the motion identification model from the data store in 422. Refer to block 402 in FIG. 4A. The computer system then receives image data of the checkout process in 424. Refer to block 404 in FIG. 4A. The computer system applies the motion identification model to the received image data to generate a confidence value for a presence of a scanning motion (426). Refer to block 406 in FIG. 4A. The computer system then determines whether the confidence value is greater than the predetermined threshold level in 428. Refer to block 408 in FIG. 4A. If the confidence value is not greater than the predetermined threshold level, then the computer system can transmit a notification to the in-store employee(s) in 430 and/or transmit notification to the customer in 432. Refer to blocks 410-412 in FIG. 4A.

If the confidence value is greater than the predetermined threshold level in 428, the computer system can determine that the scanning motion is identified in 434. Refer to block 414 in FIG. 4A. Next, the computer system can determine whether an RFID tag was detected within a threshold block of time in 436. Similar to the block 416 in FIG. 4A, the threshold block of time can be an amount of time immediately following and/or including a time at which the scanning motion was identified in the video segment. Instead of determining whether the POS terminal registered a scanning event (block 416 in FIG. 4A), the computer system determines whether an RFID tag was detected in 436. Products that do not have definitive physical shapes, such as clothing, towels, and other soft-lined items, can be identified by RFID tags. A low powered sensor can be configured near/at the checkout lane and used to detect RFID tags. Detecting an RFID tag can be advantageous to detect that a particular product is at the checkout lane and/or has been scanned. Accordingly, the computer system can validate identified scanning motions.

Moreover, as described in FIG. 4A, the determination of whether the RFID tag is detected can be performed before the computer system receives the image data in block 424 and/or before the computer system applies the motion identification model to the image data (block 426). Thus, if the RFID tag is detected, then a product has been or will be scanned and therefore the computer system may not need to analyze the image data to detect scanning motions.

If an RFID tag is detected within the threshold block of time, the computer system can identify an affirmative scanning motion during checkout in 438. Refer to block 418 in FIG. 4A. If the RFID tag is not detected, then the computer system may proceed to block 430.

In some implementations, instead of determining whether the POS terminal registered a scan in FIG. 4A or an RFID tag was detected in FIG. 4B, the computer system can analyze the image data from the overhead camera and/or image data from one or more other cameras at or near the checkout lane to determine whether a product is present within the threshold block of time. The computer system can use one or more machine learning models that are trained to identify products in a particular portion of the image data, where the particular portion of the image data can depict a bagging area or other area where products are placed after they are scanned. Using image processing and analysis techniques, the models can be trained to identify whether a product appears in the bagging area immediately after the scanning motion is identified. If the product appears in the bagging area within the threshold block of time, then the computer system can verify/validate that the customer performed an affirmative scanning motion.

Figure 5:
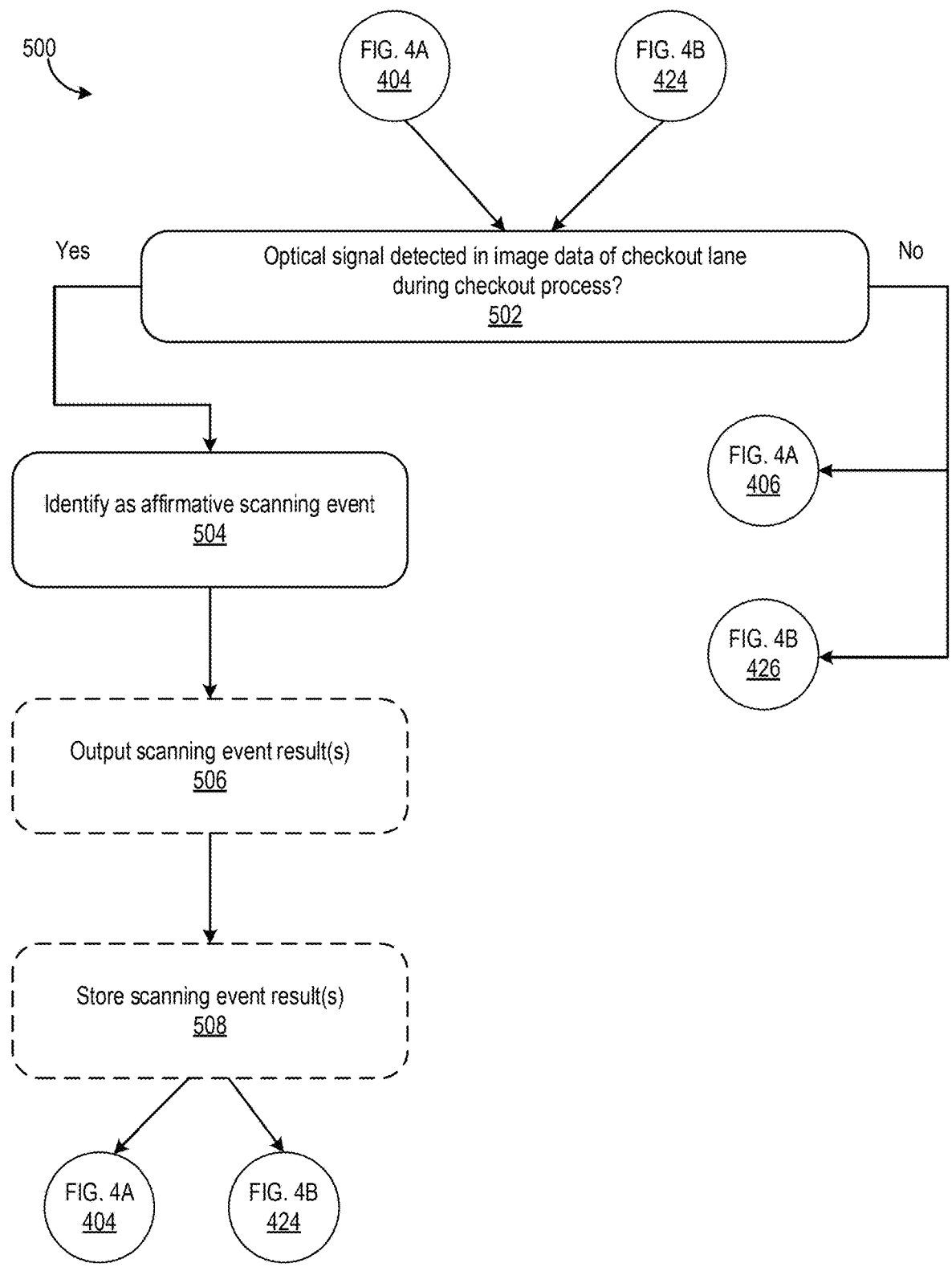
FIG. 5 is a flowchart of a process for determining whether to identify scanning motions in image data based on detection of optical signals.

FIG. 5 is a flowchart of a process 500 for determining whether to identify scanning motions in image data based on detection of optical signals. The process 500 can be performed by the computing system 102. Sometimes, the overhead camera 110 can be integrated with or otherwise part of the computing system 102. Thus, the process 500 can be performed by the overhead camera 110 and the computing system 102. One or more blocks in the process 500 can also be performed by one or more other computing systems, servers, devices, cloud services, and/or edge computing devices. For illustrative purposes, the process 500 is described from a perspective of a computing system.

The process 500 can begin after the computer system receives image data of a checkout process in block 404 in FIG. 4A and block 424 in FIG. 4B. The computer system can determine in 502 whether an optical signal is detected in the image data of the checkout lane during the checkout process. As described throughout this disclosure, one or more components at the checkout lane, such as the POS terminal and/or scanning devices can emit optical signals whenever a product is successfully scanned. For example, the POS terminal and/or the scanning devices can emit a flash of a light or a green light upon a successful product scan. The components can also emit optical signals whenever the product is not successfully scanned. For example, the POS terminal and/or the scanning devices can emit a red light upon an unsuccessful product scan. One or more other optical signals can be outputted by the components of the checkout lane to indicate to the customer whether a scan occurred.

The overhead camera can capture the optical signals appearing within the camera's FOV. Therefore, the computer system can analyze the image data captured by the overhead camera to determine whether an optical signal is present. The computer system can use one or more machine learning models that are trained to identify different types of optical signals.

The models can, for example, be trained with training data sets having image data that is annotated and labeled with successful product scans and unsuccessful product scans. Thus, the models can be trained to identify and differentiate successful scans (e.g., a single flash of a light, a green light, etc.) from unsuccessful scans (e.g., a succession of short flashes of light, a red light, etc.) based on the type of optical signal that is emitted. The models can also be trained to identify whether a screen of the POS terminal or another display screen at the checkout lane updates with information, such as price of a recently scanned item (e.g., the screen flashes, changes color, changes graphical user interface (GUI) displays, etc.). Moreover, in some implementations, the models can be trained to analyze only a portion of the image data where an optical signal is expected. The models can identify particular pixels in image data that depict or otherwise indicate optical signals.

Still referring to block 502, if the computer system detects an optical signal in the image data, then the computer system can identify an affirmative scanning event (504). Because there was a successful scan, the computer system does not need to further analyze the image data to determine whether the customer performed scanning motions. This can be beneficial to more efficiently utilize computational resources.

The computer system can optionally output scanning event results in 506. For example, the computer system can generate and transmit a notification to be outputted at the POS terminal or another component at the checkout lane. This notification can indicate to the customer that they performed a successful scan. The computer system can also generate and transmit a notification to be outputted at a user device of an in-store employee. This notification can indicate that the customer performed a successful scan.

The computer system can optionally store the scanning event results in 508. The identification of the affirmative scanning event can be stored in a data store. The scanning event results can be used by the computer system or another computing system to continuously train and/or improve the models that are described throughout this disclosure. For example, the image data depicting the optical signal can be tagged as having an affirmative scanning motion. A segment of the image data immediately before (e.g., half a second, 1 second, 2 seconds, 3 seconds, etc.) the optical signal was detected can be sliced and labeled as the affirmative scanning motion. This segment of the image data can then be used by the computer system to continuously train and improve the models such that the models can more accurately identify scanning motions such as the scanning motion that appeared in the segment of the image data.

The computer system can then proceed to receiving image data of the checkout process in blocks 404 in FIG. 4A and 424 in FIG. 4B. The process 500 can be continuously repeated until the computer system no longer receives image data of checkout processes (e.g., the store closes, no customer is detected at the checkout lane, etc.).

Referring back to block 502, if the computer system does not detect an optical signal in the image data, then the computer system can proceed to applying the motion identification model to the image data to identify scanning motions in the image data (block 406 in FIG. 4A and block 426 in FIG. 4B). The computer system can then continue with the processes 400 and 420 to identify scanning motions in the image data.

Figure 6:
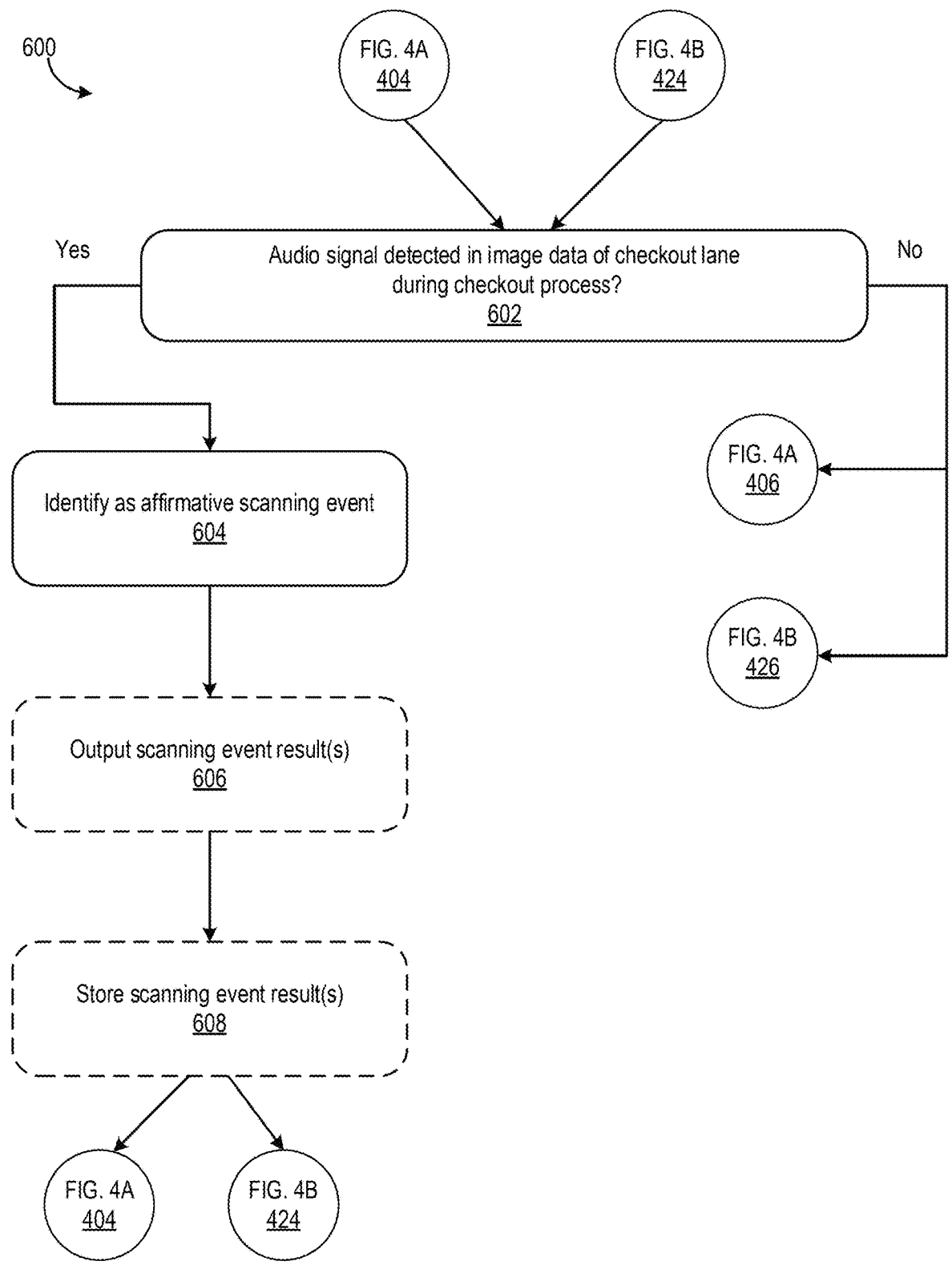
FIG. 6 is a flowchart of a process for determining whether to identify scanning motions in image data based on detection of audio signals.

FIG. 6 is a flowchart of a process 600 for determining whether to identify scanning motions in image data based on detection of audio signals. The process 600 can be performed by the computing system 102. Sometimes, the overhead camera 110 can be integrated with or otherwise part of the computing system 102. Thus, the process 600 can be performed by the overhead camera 110 and the computing system 102. One or more blocks in the process 600 can also be performed by one or more other computing systems, servers, devices, cloud services, and/or edge computing devices. For illustrative purposes, the process 600 is described from a perspective of a computing system.

Similar to the process 500 in FIG. 5, the process 600 begins once the computer system receives the image data of the checkout process in block 404 in FIG. 4A and block 424 in FIG. 4B. The computer system determines in 602 whether an audio signal is detected in the image data of the checkout lane during the checkout process. As described in reference to block 502 in FIG. 5, the computer system can use one or more machine learning models that are trained to identify and detect different types of audio signals that may exist in the image data. For example, upon a successful scan, the POS terminal can emit a chime or other verification sound. One or more of the scanning devices can also emit a chime or other verification sound. As another example, upon an unsuccessful scan, the POS terminal can emit a lower-toned sound or other sound that is different than a verification sound. The models can also be trained to extract or otherwise ignore noise in the image data, such as people talking, voices, music, or other ambient sounds. Accordingly, the computer system can utilize the models to detect and differentiate audio signals in the image data.

If the computer system determines that an audio signal indicative of a successful scan is detected in the image data (602), the computer system can identify an affirmative scanning event in 604. Refer to block 504 in FIG. 5 for additional discussion. The computer system can optionally output the scanning event result(s) in 606. Refer to block 506 in FIG. 5. The computer system can also optionally store the scanning event result(s) in 608. Refer to block 508 in FIG. 5. Moreover, the computer system can continue with the processes 400 and 420 at blocks 404 and 424, respectively (e.g., refer to FIGS. 4A-B).

If the computer system does not detect an audio signal indicative of a successful scan in the image data (e.g., there are no audio signals in the image data or the audio signals are indicative of an unsuccessful scan), then the computer system can proceed with blocks 404 and 424 in the processes 400 and 420, respectively (e.g., refer to FIGS. 4A-B), and identify scanning motions in the image data.

Figure 7:
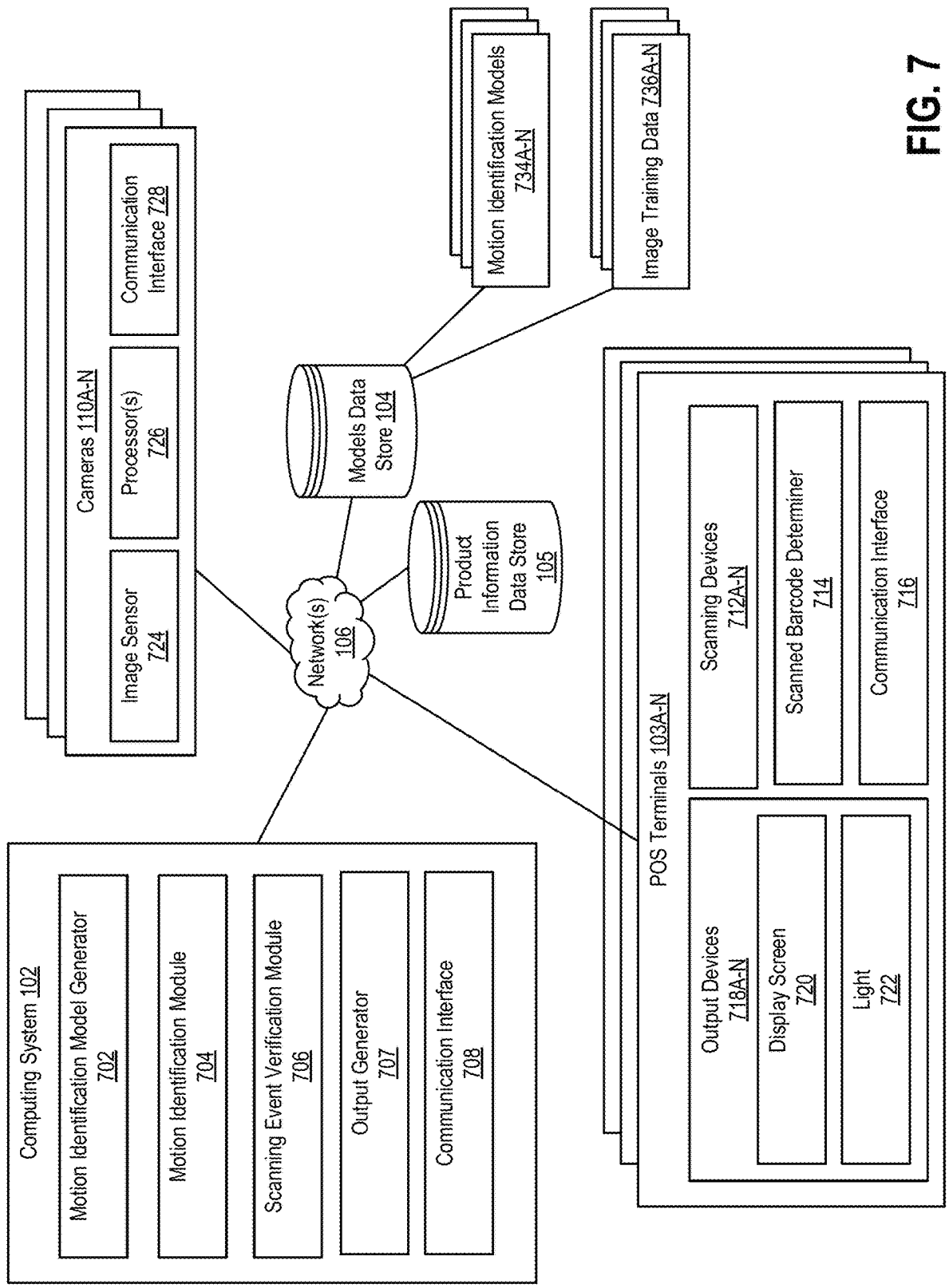
FIG. 7 is a system diagram of one or more components used to perform the techniques described herein.

FIG. 7 is a system diagram of one or more components used to perform the techniques described herein. As described herein, the computing system 102, POS terminals 103A-N, cameras 110A-N, and models data store 104 can be in communication (e.g., wired and/or wireless) over the network(s) 106. The models data store 104 and the product information data store 105 can also communicate with one or more of the components described herein via the network(s) 106.

The POS terminals 103A-N can each include scanning devices 712A-N, a scanned barcode determiner 714, a communication interface 716, and output devices 718A-N. The POS terminals 103A-N can be positioned at each checkout lane in a retail environment, such as a store. The POS terminals 103A-N can present information to a customer as they are checking out. For example, the POS terminals 103A-N can output information such as products that have been scanned by the customer, prices of the scanned products, options to search for products that may or may not have identifying labels, etc. The POS terminals 103A-N can also be configured to present a final bill or transaction to the customer and receive a form of payment from the customer to complete the checkout process.

The scanning devices 712A-N can include devices configured to scan or otherwise identify barcodes, QR codes, labels, RFID tags, and/or SKUs (e.g., refer to the scanning devices 116 in FIG. 1). For example, the scanning devices 712A-N can include a handheld scanner that the customer can point or direct towards a label on a product to be purchased. The scanning devices 712A-N can also include a flatbed scanner. The customer can move a product over the flatbed scanner, which can be configured to identify a label on the product. The scanning devices 712A-N may also include heat sensors, a scale, or other weight sensors that can be used to identify a product to be purchased. Moreover, the scanning devices 712A-N can include cameras, such as a flatbed camera and/or a camera located on a handheld scanner.

The scanned barcode determiner 714 can be configured to identify a product based on a barcode or other label that is scanned by the scanning devices 712A-N during a checkout process. For example, the scanned barcode determiner 714 can receive the scanned barcode from the scanning devices 712A-N. The scanned barcode determiner 714 can retrieve product information from the product information data store 105 using the scanned barcode as an identifier. For example, the scanned barcode determiner 714 can match the scanned barcode with a SKU of a product in the product information data store 105. Once the scanned barcode is matched with a product, the scanned barcode determiner 714 can identify a price for that product. The price can be outputted to the customer at a display of the POS terminal 103A-N and/or another display screen at the checkout lane (e.g., the display screen 113 in FIG. 1). Product information associated with the scanned barcode, which can be stored in the product information data store 105, can also be transmitted to the computing system 102 and used by the computing system 102 to determine whether an affirmative scanning motion was made by the customer. For example, the scanned barcode determiner 714's price identification can be transmitted to the computing system 102 and used by the computing system 102 to validate or otherwise verify an affirmative scanning motion determination.

The output devices 718A-N can provide some form of output that indicates a scanning event took place at the POS terminal 103A-N. For example, the output devices 718A-N an include a display screen 720 and a light 722. The output devices 718A-N can include one or more other devices, such as an audio output/speaker. The audio output can, for example, emit audio signals indicating successful or unsuccessful scans at the checkout lane. The display screen 720 can be configured to output information about the customer's transaction, such as products that have been scanned, prices for the scanned products, and a total cost for the customer's transaction. The display screen 720 can also receive input from the customer indicating what products the user is purchasing. For example, the display screen 720 can provide a search feature where the customer can input parameters to search for a particular product (e.g., fresh produce, products that do not have barcodes, products that are weighed, etc.). The light 722 can be configured to automatically illuminate a scanning area in the checkout lane when the customer scans products. In other words, when the scanning devices 712A-N are activated, the light 722 can illuminate the scanning area to provide uniform lighting over the product that is being scanned. As a result, a barcode or other product identifier can be more accurately captured by the scanning devices 712A-N. The light 722 can be any type of light signal including but not limited to an infrared light, LiDAR, red light, an LED, etc. The light 722 can also be detected by the cameras 110A-N in order to determine whether a scanning event has occurred at the checkout lane. For example, the light 722 can emit an optical signal such as a flashing light or a green light when a successful scan is registered at the checkout lane. The light 722 can also emit an optical signal such as a continuously flashing light or a red light when an unsuccessful scan is registered.

The cameras 110A-N can be low resolution overhead cameras that are installed in the retail environment, such as a store. For example, the cameras 110A-N can be installed in a ceiling of the store surrounding or in the checkout area. The cameras 110A-N can be part of a security system and/or already part of/installed in the store. Therefore, new or additional equipment may not have to be installed in the store to perform the techniques described throughout this disclosure. The cameras 110A-N can include an image sensor 724, processor(s) 726, and a communication interface 728. As described throughout this disclosure, sometimes, the cameras 110A-N can be part of a same system as the computing system 102. The cameras 110A-N can also be separate from the computing system 102.

The image sensor 724 can be configured to capture image data from a FOV of each of the cameras 110A-N. The image sensor 724 can capture a stream of images and/or videos. The image sensor 724 can continuously capture the image data. Sometimes, the image sensor 724 can capture the image data upon detecting a scanning event in a checkout lane. The image sensor 724 can be trained on one or more checkout lanes in the checkout area. The captured image data can therefore include the one or more checkout lanes, as described herein (e.g., refer to FIGS. 1-2).

The processor(s) 726 can be configured to detect when a scanning event occurs in the checkout lane and/or when a checkout process begins. Based on detecting the scanning event or start of the checkout process, the processor(s) 726 can instruct the image sensor 724 to capture the image data. The processor(s) 726 can also select a portion of the image data that was captured at a same time that the scanning event was detected. The processor(s) 726 can detect the scanning event based on identifying a light signal, audio signal, or other optical signal that originates from the output devices 718A-N of the POS terminals 103A-N. The processor(s) 726 can also detect the start of the checkout process based on detecting presence of the user at the checkout lane. In some implementations, the processor(s) 726 can also determine or otherwise identify which checkout lane the scanning event originated from (e.g. refer to FIG. 2). Finally, the processor(s) 726 can be transmit the captured image data to the computing system 102 for further processing and analysis.

The computing system 102 can include a motion identification model generator 702, a motion identification module 704, a scanning event verification module 706, an output generator 707, and a communication interface 708. Such components can be configured to perform the techniques described throughout this disclosure.

The motion identification model generator 702 can be configured to generate and train the motion identification models as described in reference to FIGS. 3A-B. The motion identification models can be trained using image training data 736A-N. The image training data 736A-N can be retrieved, by the motion identification model generator 702, from the models data store 104. The generator 702 can also receive the image training data 736A-N directly from one or more of the cameras 110A-N. The generated motion identification models can be stored as motion identification models 734A-N in the models data store 104. The motion identification models 734A-N can then be retrieved and used by the computing system 102 during runtime to identify scanning motions made by customers in the image data.

The motion identification module 704 can be configured to identify scanning motions made by the customer during a checkout process using the techniques described herein (e.g., refer to FIGS. 4-6). The motion identification module 704 can receive, from one or more of the cameras 110A-N, image data of a customer's body movements at the checkout lane. The motion identification module 704 can also apply one or more of the motion identification models 734A-N to the image data to identify affirmative scanning motions.

The scanning event verification module 706 can be configured to verify or validate a scanning motion that was identified by the motion identification module 704. The module 706 can, for example, analyze the image data to determine whether an optical signal or audio signal is detected within a threshold block of time from the identified scanning motion. If the module 706 identifies an optical or audio signal within the threshold block of time, the module 706 can validate that the motion identification module 704 correctly identified an affirmative scanning motion. The module 706 can also poll the POS terminals 103A-N to determine whether the POS terminal registered a scanning event. If the POS terminal registered a scanning event within the threshold block of time, the module 706 can determine that the motion identification module 704 correctly identified an affirmative scanning motion. This determination can also be transmitted to the motion identification model generator 702 to continuously improve and train the motion identification models 734A-N. If the module 706 cannot verify the scanning motion, the module 706 can transmit an alert or similar notification to the output generator 707.

The output generator 707 can be configured to generate notifications or other messages/information that can be transmitted to different users, as described throughout this disclosure. For example, if the motion identification module 704 identifies a scanning motion with a low confidence value, the output generator 707 can generate and transmit a notification of a missed scan to the POS terminal or another user device that is used by or near the customer. The output generator 707 can also generate and transmit a notification of a missed scan to a user device of an in-store employee. As a result, the in-store employee can review the image data and determine whether the customer is engaging in suspicious activity, whether the customer should be apprehended, and/or whether the customer should be monitored. Similarly, the output generator 707 can generate appropriate output based on determinations that are made by the scanning event verification module 706.

Finally, the communication interfaces 708, 716, and 728 can be configured to provide for communication between one or more of the components and/or systems or devices described herein, via the network(s) 106.

Figure 8A:
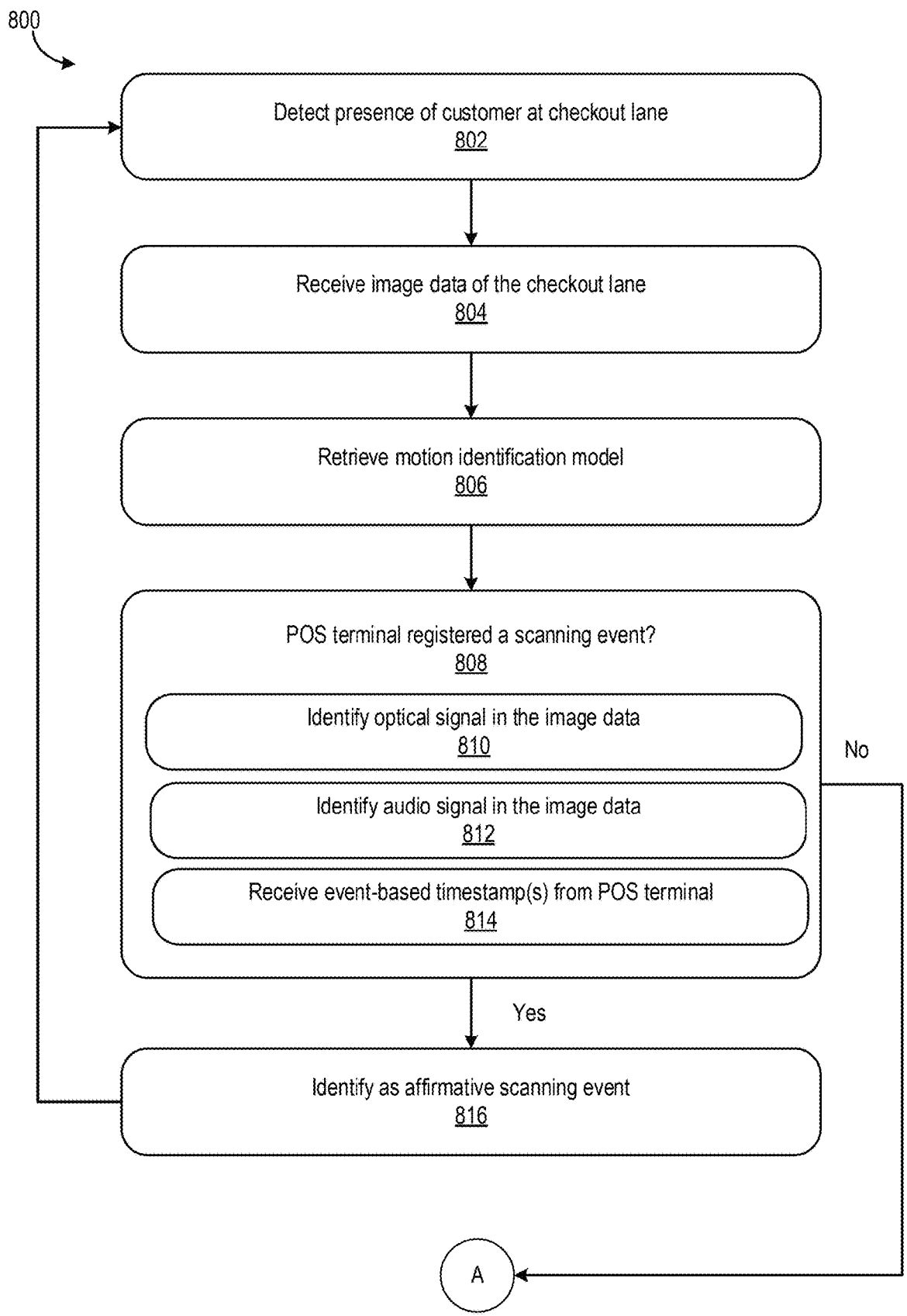
FIGS. 8A-B depict a flowchart of a process for identifying scanning motions in image data using a motion identification model.
Figure 8B:
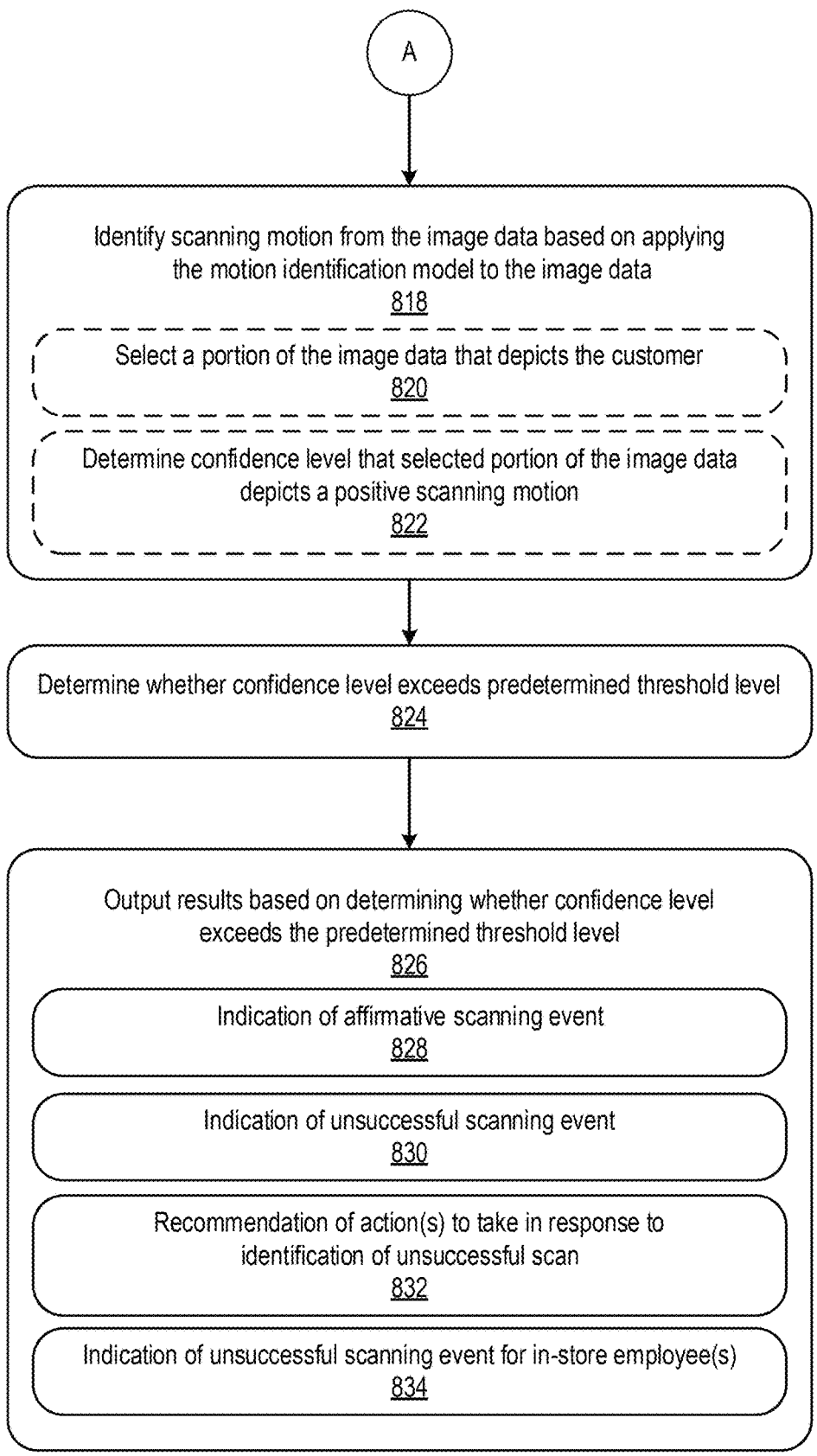

FIGS. 8A-B depict a flowchart of a process 800 for identifying scanning motions in image data using a motion identification model. The process 800 can be performed by the computing system 102. Sometimes, the overhead camera 110 can be integrated with or otherwise part of the computing system 102. Thus, the process 800 can be performed by the overhead camera 110 and the computing system 102. One or more blocks in the process 800 can also be performed by one or more other computing systems, servers, devices, cloud services, and/or edge computing devices. For illustrative purposes, the process 800 is described from a perspective of a computer system.

Referring to process 800 in both FIGS. 8A-B, the computer system can detect presence of a customer at a checkout lane in 802. The customer can, for example, select an option or provide some other form of input at a display screen of a POS terminal or some other device at the checkout lane. This input can be transmitted to the computer system and used by the computer system to determine that a checkout process has begun (e.g., that the customer is present at the checkout lane). As another example, the customer can begin scanning products at the checkout lane. Scanning of a product can trigger detection of customer presence at the checkout lane. As yet another example, one or more cameras at or near the checkout lane (e.g., overhead cameras, cameras integrated into the checkout lane, such as along a light pole and/or embedded in a display screen) can capture image data (e.g., video and/or images) that depict the customer at the checkout lane. Detection of the customer in that image data can trigger the process 800 to begin.

Once the customer is detected at the checkout lane in 802, the computer system can receive image data of the checkout lane as described throughout this disclosure (804). The overhead camera(s) can continuously capture image data of the checkout lane. Sometimes, the overhead camera(s) can automatically transmit the image data to the computer system in real-time, near real-time, and/or at predetermined time intervals. Sometimes, the overhead camera(s) can transmit the image data to the computer system only upon detection of the customer at the checkout lane (802). For example, the computer system can transmit a request to the overhead camera(s) for the image data. The request can indicate a segment of the image data that the computer system would like to analyze, such as a 7 second video segment that was captured immediately before the customer presence was detected and continuing after the customer was detected. The request can also include a timestamp that can be used to identify the appropriate video segment to transmit to the computer system. In some implementations, the request can merely be for an entirety of image data that was captured since the user presence was detected, instead of particular segments or slices of the image data.

The computer system can retrieve one or more motion identification models from a data store in 806, as described throughout this disclosure.

In 808, the computer system can determine whether the POS terminal registered a scanning event. As described in reference to FIGS. 4-6, the computer system can identify an optical signal in the image data (810), identify an audio signal in the image data (812), and/or receive event-based timestamp(s) from the POS terminal where the checkout process is taking place (814).

As an illustrative example, the customer can use a handheld scanner to scan a barcode of a water bottle at the checkout lane. When the customer directs the handheld scanner at the barcode on the bottle, a red light is emitted by the handheld scanner to illuminate the barcode during this scanning event. Using one or more machine learning models, the computer system can detect the red light emitted by the handheld scanner and identify that a positive scanning event has occurred (816).

As another illustrative example, the customer can move an avocado having a product label across a flatbed scanner at the checkout lane. Upon successful detection and scanning of the product label, the POS terminal and/or the flatbed scanner can emit a chime or other audio signal. The computer system can detect and identify the audio signal in the image data, thus identifying that an affirmative scanning event occurred (816).

As yet another illustrative example, the customer can move a book having a product label across the flatbed scanner at the checkout lane. Upon successful detection and scanning of the product label by the flatbed scanner, a display screen of a POS terminal at the checkout lane can change displays, light up, or otherwise update the customer's bill. The activity on the display screen can be detected in the image data by the computer system. The activity on the display screen can also be received as part of an event-based timestamp from the POS terminal (e.g., the POS terminal can transmit a data feed or log of transaction data to the computer system). Accordingly, the computer system can identify that an affirmative scanning event occurred (816).

In some implementations, the computer system can transmit a request to the POS terminal at predetermined times, where the request prompts the POS terminal for any scan data (e.g., the customer scans products at the checkout lane), transaction data (e.g., the customer completes the transaction and pays), or other activity (e.g., the customer searches for a product at a display screen of the POS terminal or manually inputs information about a product that does not have a barcode) that occurred during a predetermined period of time (814). The POS terminal can transmit a response to the computer system that includes timestamps for each scan, transaction, or other activity that occurred during the predetermined period of time. Using these event-based timestamps, the computer system can determine whether a scanning event was in fact registered. The computer system can therefore identify an affirmative scanning event based on receiving the event-based timestamp(s) from the POS terminal in 814 (816).

Sometimes, the POS terminal can automatically transmit event-based timestamps to the computer system without requiring the computer system to transmit requests. For example, every time that a product is scanned at the checkout lane, the POS terminal can transmit information to the computer system such as a timestamp when the barcode or product label is scanned, the scanned barcode, a price associated with the scanned barcode, and other product information associated with the scanned barcode (e.g., product name). As another example, the POS terminal can automatically transmit such information to the computer system at predetermined time intervals. As a result, the POS terminal can transmit timestamps associated with multiple scanning events, where each timestamp indicates a different product that has been scanned. As yet another example, the POS terminal can automatically transmit such information to the computer system once the customer is done scanning products and the customer selects an option presented at the POS terminal to complete the transaction.

If the computer system determines that the POS terminal registered a scanning event in 808, the computer system identifies an affirmative scanning event in 816. The computer system can return to block 802 and repeat the process 800 described herein for every customer that is detected at a checkout lane. In some implementations, the computer system can return to block 804 and receive new image data of the checkout lane for the same customer that was detected in 802. For example, the computer system can determine in 808 that the POS terminal registered a scanning event for a first product and the customer is continuing to scan additional products. Thus, the computer system can return to block 804, receive image data of the customer scanning additional products, and continue through the process 800 as described herein. In some implementations, the computer system can continuously receive image data from the overhead camera(s) while the customer is at the checkout lane. In such scenarios, the computer system can return to block 808 after block 816, and determine whether the POS terminal registered a scanning event at some time after the POS terminal registered the first scanning event.

If the computer system determines that the POS terminal did not register a scanning event in 808, the computer system can identify a scanning motion from the image data based on applying the motion identification model to the image data in 818. Refer to FIGS. 4A-B for further discussion on identifying the scanning motion.

In some implementations, as depicted and described in FIG. 2, an overhead camera can capture multiple checkout lanes in the same FOV. As part of identifying the scanning motion in the image data, the computer system needs to determine which checkout lane depicted in the image data is associated with the customer. Thus, the computer system can select a portion of the image data that depicts the customer (820). Block 820 can be optionally performed. In some implementations, for example, block 820 may not need to be performed if the overhead camera is focused on only one checkout lane. The computer system can use one or more machine learning models that are trained to detect or otherwise identify a customer at one of the checkout lanes. The models can also be trained to detect which checkout lane emits optical and/or audio signals indicative of the user being present and performing the checkout process. By selecting the portion of the image data that depicts the customer, the computer system can more efficiently utilize computational resources by processing smaller image data. Next, the computer system can determine a confidence level that the selected portion of the image data depicts a positive scanning motion (822). Refer to FIGS. 4A-B for further discussion about identifying the scanning motion from the image data and assigning the confidence level.

In 824, the computer system can determine whether the confidence level exceeds a predetermined threshold level. Refer to FIGS. 4A-B for further discussion.

The computer system can then output results based on determining whether the confidence level exceeds the predetermined threshold level in 826. For example, the computer system can generate and output an indication of an affirmative scanning event (828) based on determining that the confidence level exceeds the predetermined threshold level. The indication can be a notification, message, optical signal, and/or audio signal. The computer system can generate and output an indication of an unsuccessful scanning event (830) based on determining that the confidence level is less than the predetermined threshold level. The indication can be a notification, message, optical signal, and/or audio signal. The indication can, for example, be a notification or other message that informs the customer that the customer did not properly scan the product. The indications that are generated in blocks 828 and 830 can be outputted at the POS terminal, a display screen at the checkout lane, or another device that is used by the customer during the checkout process (e.g., the customer's mobile device).

As another example, the computer system can generate and output a recommendation of action(s) to be taken in response to identification of an unsuccessful scan (832). The recommendation can be provided to the customer at the POS terminal, the display screen, and/or the other device. The recommendation can, in some implementations, prompt the customer to try rescanning the product. The recommendation can, in some implementations, prompt the customer to move closer to the flatbed scanning area and/or one or more scanning devices. One or more other recommendations can be generated and outputted in 832.

In some implementations, the recommendation can be transmitted to a user device of an in-store employee. The recommendation can prompt the in-store employee (e.g., safety and security personnel) to review a segment of the image data to determine whether the customer is engaging in suspicious activity. In some implementations, the recommendation can prompt the in-store employee to intervene, apprehend the customer, and/or prevent the customer from completing the checkout process and/or leaving the store.

The computer system can also generate and output an indication of an unsuccessful scanning event for the in-store employee (834). Similar to the recommendation in 832, the indication in block 834 can notify the in-store employee that the customer may be engaging in suspicious activity. The in-store employee can then determine whether to pursue further review of the image data, monitor the customer, and/or apprehend the customer.

The process 800 can be performed for each user that is detected at a checkout lane in a store. Moreover, the process 800 can be performed simultaneously for users that are detected at multiple checkout lanes in the store and/or across a network of stores.

Figure 9:
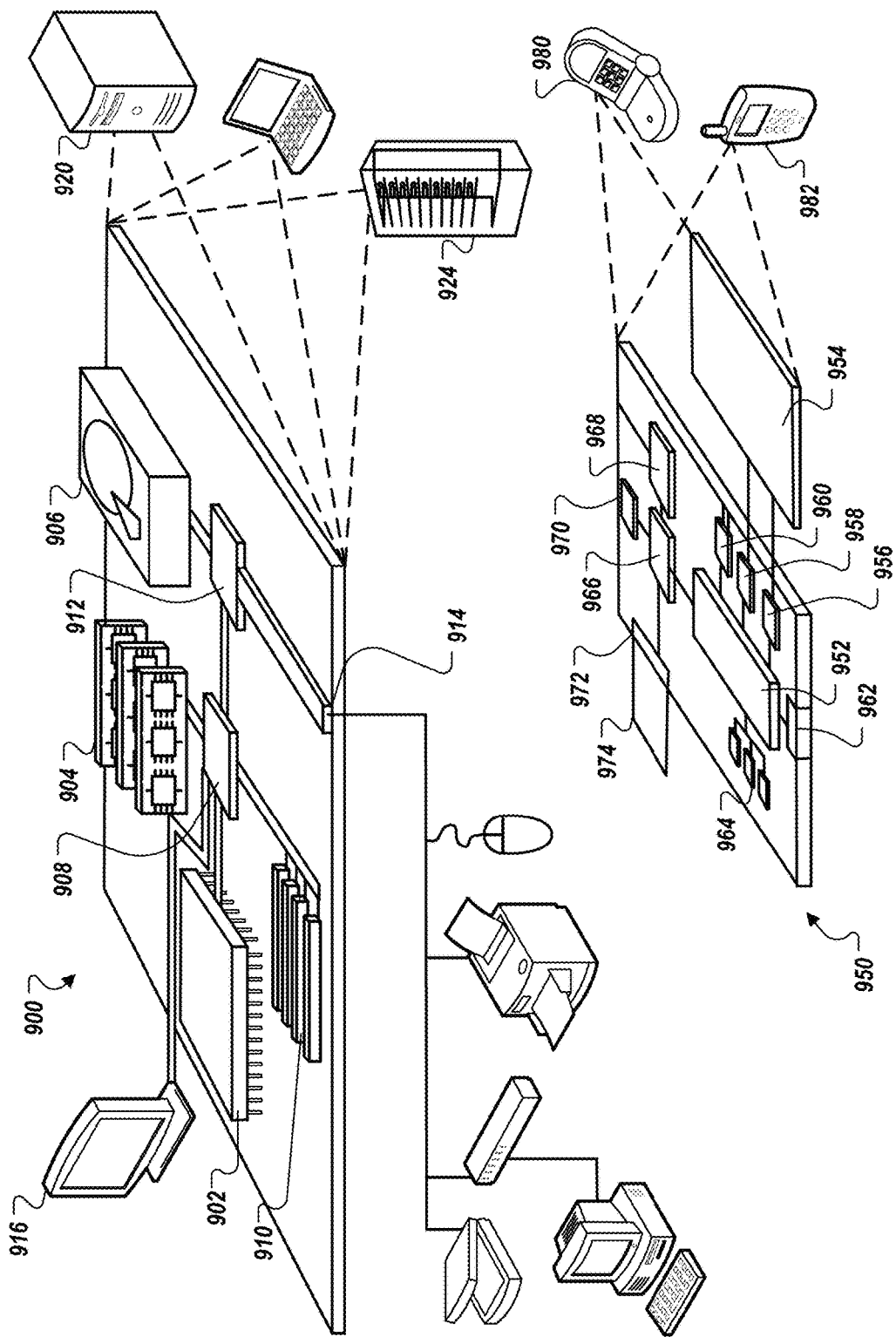
FIG. 9 is a schematic diagram that shows an example of a computing device and a mobile computing device that can be used to perform the techniques described herein.

FIG. 9 is a schematic diagram that shows an example of a computing device 900 and a mobile computing device that can be used to perform the techniques described herein. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for determining whether a scanning motion occurred during a checkout process, the system comprising:
   a checkout lane including:
      a scanning area configured to receive one or more products to be purchased by a user, the scanning area including one or more scanning devices;
      a point of sale (POS) terminal configured to identify a product based on a scan, using the one or more scanning devices, of a product identifier for the product as the product is moved through the scanning area;
      an overhead camera having a field of view that includes the scanning area, wherein the overhead camera is configured to:
         capture image data of the user's body movements as the user moves the product through the scanning area; and
         transmit, to a computing system, the image data of the user's body movements; and
   a computing system configured to determine, during runtime, whether the user's body movements are scanning motions, the computing system configured to:
      retrieve, from a data store, one or more motion identification models, wherein the one or more motion identification models were previously trained using image training data and one or more machine learning motion identification models;
      identify whether a scanning motion occurred during the user's body movements based on application of the one or more motion identification models to the image data;
      determine, based on identification of the scanning motion, that the user performed an affirmative scan during the checkout process; and
      poll the POS terminal for an indication of a registered scanning event;
      determine whether the registered scanning event is within a threshold period of time from the scanning motion based on comparing a timestamp of the registered scanning event with a timestamp of the scanning motion; and
      determine, based on the registered scanning event being within the threshold period of time from the scanning motion, that the user performed the affirmative scan during the checkout process.

2. The system of claim 1, wherein the overhead camera has a field of view that includes scanning areas of multiple checkout lanes.

3. The system of claim 1, wherein the image training data includes video feeds of a plurality of scanning motions of users taken from a plurality of overhead cameras at a plurality of checkout lanes, wherein the plurality of overhead cameras have at least one of a same (i) vantage point of the plurality of checkout lanes, (ii) field of view, (iii) lighting, or (iv) image resolution.

4. The system of claim 1, wherein the computing system is further configured to generate the one or more motion identification models based on:
   retrieving, from the data store, (i) the image training data that have been previously annotated with a plurality of affirmative scanning motions and (ii) other training data;
   training, based on correlating (i) with (ii), the one or more motion identification models to identify the plurality of affirmative scanning motions in the image training data; and
   outputting the one or more motion identification models.

5. The system of claim 4, wherein the other training data includes at least one of (i) POS transaction data that correlates with the plurality of affirmative scanning motions depicted in the image training data, (iii) payment information that correlates with the POS transaction data, or (iv) user input provided at the POS terminal that correlates with at least one of the plurality of affirmative scanning motions or the POS transaction data.

6. The system of claim 4, wherein the computing system is configured to generate the one or more motion identification models based at least in part on lighting conditions, equipment in the checkout lane, a store configuration, and seasonal information.

7. The system of claim 1, wherein the computing system is further configured to:
   determine, based on the registered scanning event exceeding the threshold period of time from the scanning motion, that the user did not perform the affirmative scan during the checkout process; and
   generate output indicating that the user did not perform the affirmative scan.

8. The system of claim 7, wherein the output is a notification prompting the user to rescan the product identifier for the product, wherein the computing system is configured to transmit the notification to the POS terminal to be presented on a display screen at the checkout lane.

9. The system of claim 7, wherein the output is a notification for an in-store employee that indicates that the user did not perform the affirmative scan, wherein the computing system is configured to transmit the notification to a user device of the in-store employee to be presented on a display screen of the user device.

10. The system of claim 1, wherein the computing system is further configured to:
   identify whether an optical signal is detected in the image data; and
   determine, based on identification that the optical signal is not detected, whether the scanning motion occurred based on application of the one or more motion identification models to the image data.

11. The system of claim 10, wherein the computing system is further configured to determine, based on identification that the optical signal is detected, that the user performed the affirmative scan during the checkout process.

12. The system of claim 10, wherein the optical signal is at least one of a flash of light, an infrared signal, a red light, a green light, or a change in display on a display screen of the POS terminal, wherein the optical signal is emitted by at least one of the POS terminal or the one or more scanning devices.

13. The system of claim 1, wherein the computing system is further configured to:
identify whether an audio signal is detected in the image data; and
determine, based on identification that the audio signal is not detected, whether the scanning motion occurred based on application of the one or more motion identification models to the image data.

14. The system of claim 13, wherein the computing system is further configured to determine, based on identification that the audio signal is detected, that the user performed the affirmative scan during the checkout process.

15. The system of claim 1, wherein the computing system is further configured to:
detect presence of the user at the checkout lane based at least in part and on at least one of (i) identifying the user in the image data, (ii) receiving, from the POS terminal, input provided by the user at the POS terminal, or (iii) identifying, based on one or more weight sensors at the checkout lane, weight of one or more products that are placed by the user at the checkout lane;
retrieve, from the data store and based on detecting the presence of the user, the one or more motion identification models; and
identify whether the scanning motion occurred based on application of the one or more motion identification models to the image data.

16. The system of claim 1, wherein determining, based on identification of the scanning motion, that the user performed an affirmative scan during the checkout process comprises:
determining whether a confidence level of the scanning motion exceeds a predetermined threshold level;
identify, based on determining that the confidence level exceeds the predetermined threshold level, that the user performed an affirmative scan; and
identify, based on determining that the confidence level is less than the predetermined threshold level, that the user did not perform an affirmative scan.

17. The system of claim 1, wherein the computing system is further configured to generate output indicating that the user did not perform the affirmative scan.

18. A computing system for determining whether a scanning motion occurred during a checkout process, the computing system configured to, during runtime:
receive, from an overhead camera at a checkout lane, image data of a user's body movement as the user moves a product through a scanning area at the checkout lane;
retrieve, from a data store, one or more motion identification models, wherein the one or more machine learning models were previously trained using image training data and one or more machine learning motion identification models;
identify whether a scanning motion occurred during the user's body movements based on application of the one or more motion identification models to the image data; and
determine, based on identification of the scanning motion, that the user performed an affirmative scan during the checkout process,
wherein the computing system is further configured to generate the one or more motion identification models based on:
retrieving, from the data store, (i) the image training data that have been previously annotated with a plurality of affirmative scanning motions and (ii) other training data;
training, based on correlating (i) with (ii), the one or more motion identification models to identify the plurality of affirmative scanning motions in the image training data; and
outputting the one or more motion identification models.

19. The computing system of claim 18, wherein the other training data includes at least one of (i) POS transaction data that correlates with the plurality of affirmative scanning motions depicted in the image training data, (iii) payment information that correlates with the POS transaction data, or (iv) user input provided at the POS terminal that correlates with at least one of the plurality of affirmative scanning motions or the POS transaction data.

20. The computing system of claim 18, wherein the computing system is further configured to generate the one or more motion identification models based at least in part on lighting conditions, equipment in the checkout lane, a store configuration, and seasonal information.

21. A system for determining whether a scanning motion occurred during a checkout process, the system comprising:
a checkout lane including:
a scanning area configured to receive one or more products to be purchased by a user, the scanning area including one or more scanning devices;
a point of sale (POS) terminal configured to identify a product based on a scan, using the one or more scanning devices, of a product identifier for the product as the product is moved through the scanning area;
an overhead camera having a field of view that includes the scanning area, wherein the overhead camera is configured to:
capture image data of the user's body movements as the user moves the product through the scanning area; and
transmit, to a computing system, the image data of the user's body movements; and
a computing system configured to determine, during runtime, whether the user's body movements are scanning motions, the computing system configured to:
retrieve, from a data store, one or more motion identification models, wherein the one or more motion identification models were previously trained using image training data and one or more machine learning motion identification models, wherein generating the one or more motion identification models is further based on:
retrieving, from the data store, (i) the image training data that have been previously annotated with a plurality of affirmative scanning motions and (ii) other training data;

training, based on correlating (i) with (ii), the one or more motion identification models to identify the plurality of affirmative scanning motions in the image training data; and outputting the one or more motion identification models;

identify whether a scanning motion occurred during the user's body movements based on application of the one or more motion identification models to the image data; and determine, based on identification of the scanning motion, that the user performed an affirmative scan during the checkout process.

22. The system of claim 21, wherein the other training data includes at least one of (i) POS transaction data that correlates with the plurality of affirmative scanning motions depicted in the image training data, (iii) payment information that correlates with the POS transaction data, or (iv) user input provided at the POS terminal that correlates with at least one of the plurality of affirmative scanning motions or the POS transaction data.

23. The system of claim 21, wherein the computing system is configured to generate the one or more motion identification models based at least in part on lighting conditions, equipment in the checkout lane, a store configuration, and seasonal information.

24. A system for determining whether a scanning motion occurred during a checkout process, the system comprising:
a checkout lane including:
a scanning area configured to receive one or more products to be purchased by a user, the scanning area including one or more scanning devices;
a point of sale (POS) terminal configured to identify a product based on a scan, using the one or more scanning devices, of a product identifier for the product as the product is moved through the scanning area;
an overhead camera having a field of view that includes the scanning area, wherein the overhead camera is configured to:
capture image data of the user's body movements as the user moves the product through the scanning area; and
transmit, to a computing system, the image data of the user's body movements; and
a computing system configured to determine, during runtime, whether the user's body movements are scanning motions, the computing system configured to:
retrieve, from a data store, one or more motion identification models, wherein the one or more motion identification models were previously trained using image training data and one or more machine learning motion identification models;
identify whether a scanning motion occurred during the user's body movements based on application of the one or more motion identification models to the image data; and
determine, based on identification of the scanning motion, that the user performed an affirmative scan during the checkout process, wherein the computing system is further configured to:
identify whether an audio signal is detected in the image data; and
determine, based on identification that the audio signal is not detected, whether the scanning motion occurred based on application of the one or more motion identification models to the image data.

25. The system of claim 24, wherein the computing system is further configured to determine, based on identification that the audio signal is detected, that the user performed the affirmative scan during the checkout process.

26. The system of claim 24, wherein the computing system is further configured to generate the one or more motion identification models based on:
retrieving, from the data store, (i) the image training data that have been previously annotated with a plurality of affirmative scanning motions and (ii) other training data;
training, based on correlating (i) with (ii), the one or more motion identification models to identify the plurality of affirmative scanning motions in the image training data; and
outputting the one or more motion identification models.

27. A system for determining whether a scanning motion occurred during a checkout process, the system comprising:
a checkout lane including:
a scanning area configured to receive one or more products to be purchased by a user, the scanning area including one or more scanning devices;
a point of sale (POS) terminal configured to identify a product based on a scan, using the one or more scanning devices, of a product identifier for the product as the product is moved through the scanning area;
an overhead camera having a field of view that includes the scanning area, wherein the overhead camera is configured to:
capture image data of the user's body movements as the user moves the product through the scanning area; and
transmit, to a computing system, the image data of the user's body movements; and
a computing system configured to determine, during runtime, whether the user's body movements are scanning motions, the computing system configured to:
detect presence of the user at the checkout lane based at least in part and on at least one of (i) identifying the user in the image data, (ii) receiving, from the POS terminal, input provided by the user at the POS terminal, or (iii) identifying, based on one or more weight sensors at the checkout lane, weight of one or more products that are placed by the user at the checkout lane;
retrieve, from a data store and based on detecting the presence of the user, one or more motion identification models, wherein the one or more motion identification models were previously trained using image training data and one or more machine learning motion identification models;
identify whether a scanning motion occurred during the user's body movements based on application of the one or more motion identification models to the image data; and
determine, based on identification of the scanning motion, that the user performed an affirmative scan during the checkout process.

28. The system of claim 27, wherein the computing system is further configured to:
poll the POS terminal for an indication of a registered scanning event;
determine whether the registered scanning event is within a threshold period of time from the scanning motion based on comparing a timestamp of the registered scanning event with a timestamp of the scanning motion; and determine, based on the registered scanning event being within the threshold period of time from the scanning motion, that the user performed an affirmative scan during the checkout process.

29. The system of claim 28, wherein the computing system is further configured to:

determine, based on the registered scanning event exceeding the threshold period of time from the scanning motion, that the user did not perform an affirmative scan during the checkout process; and generate output indicating that the user did not perform the affirmative scan.

30. A system for determining whether a scanning motion occurred during a checkout process, the system comprising:

a checkout lane including:
  a scanning area configured to receive one or more products to be purchased by a user, the scanning area including one or more scanning devices;
  a point of sale (POS) terminal configured to identify a product based on a scan, using the one or more scanning devices, of a product identifier for the product as the product is moved through the scanning area;
  an overhead camera having a field of view that includes the scanning area, wherein the overhead camera is configured to:
    capture image data of the user's body movements as the user moves the product through the scanning area; and
    transmit, to a computing system, the image data of the user's body movements; and
a computing system configured to determine, during runtime, whether the user's body movements are scanning motions, the computing system configured to:
  retrieve, from a data store, one or more motion identification models, wherein the one or more motion identification models were previously trained using image training data and one or more machine learning motion identification models;
  identify whether a scanning motion occurred during the user's body movements based on application of the one or more motion identification models to the image data; and
  determine, based on identification of the scanning motion, that the user performed an affirmative scan during the checkout process,
wherein determining, based on identification of the scanning motion, that the user performed an affirmative scan during the checkout process comprises:
  determining whether a confidence level of the scanning motion exceeds a predetermined threshold level;
  identifying, based on determining that the confidence level exceeds the predetermined threshold level, that the user performed an affirmative scan; and
  identifying, based on determining that the confidence level is less than the predetermined threshold level, that the user did not perform an affirmative scan.

31. The system of claim 30, wherein the computing system is further configured to:

poll the POS terminal for an indication of a registered scanning event;

determine whether the registered scanning event is within a threshold period of time from the scanning motion based on comparing a timestamp of the registered scanning event with a timestamp of the scanning motion; and determine, based on the registered scanning event being within the threshold period of time from the scanning motion, that the user performed the affirmative scan during the checkout process.

32. The system of claim 30, wherein the computing system is further configured to generate the one or more motion identification models based on:

retrieving, from the data store, (i) the image training data that have been previously annotated with a plurality of affirmative scanning motions and (ii) other training data;

training, based on correlating (i) with (ii), the one or more motion identification models to identify the plurality of affirmative scanning motions in the image training data; and outputting the one or more motion identification models.

* * * * *